INVENTOR.
Peter P. Spolsino

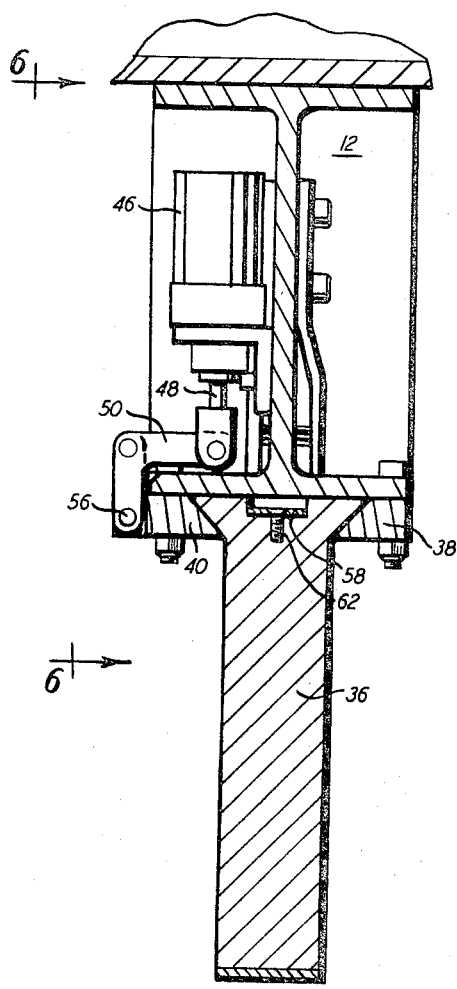
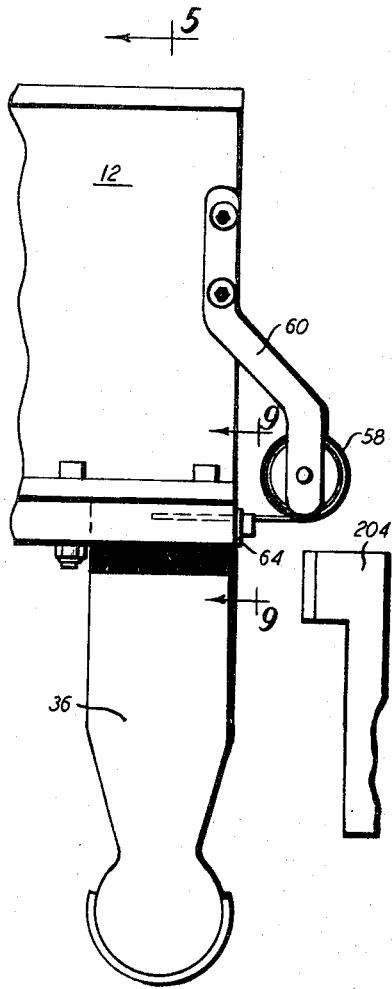
FIG.-5
FIG.-4

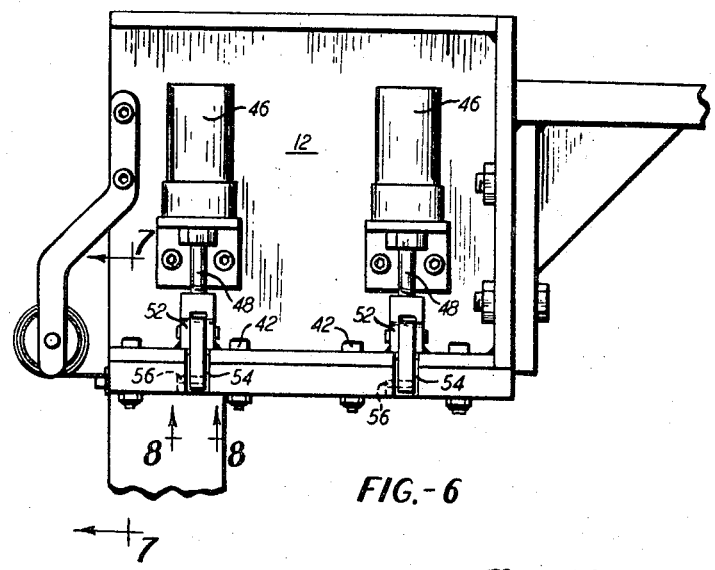
FIG.-6
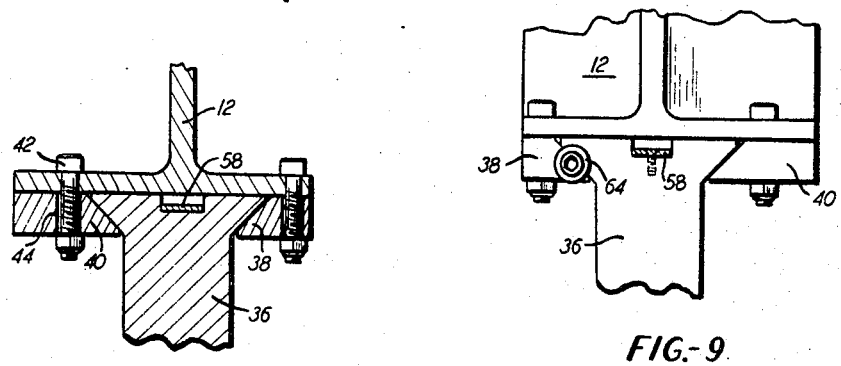
FIG.-7
FIG.-9
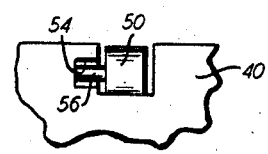
FIG.-8

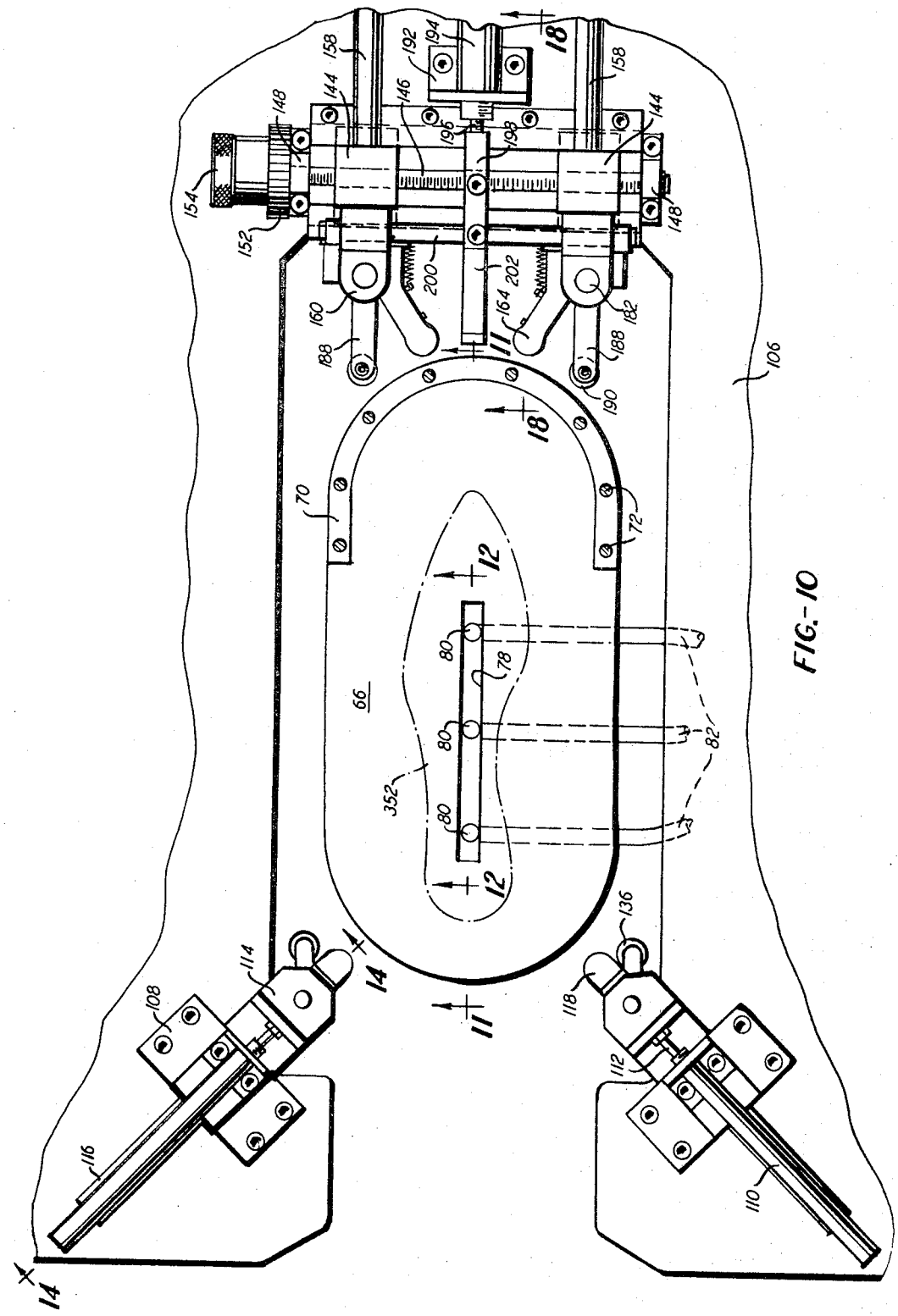

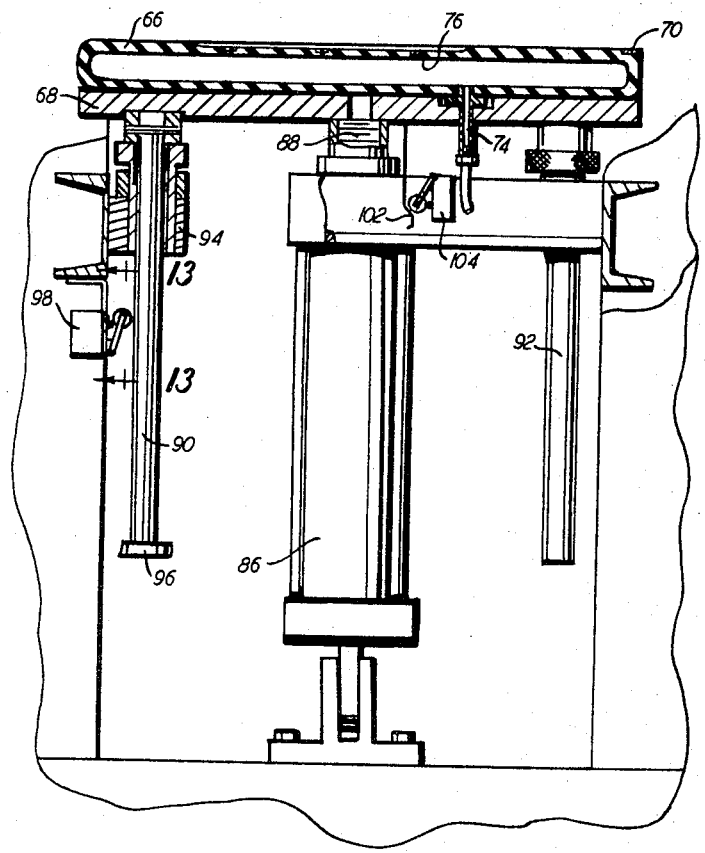
FIG.-11
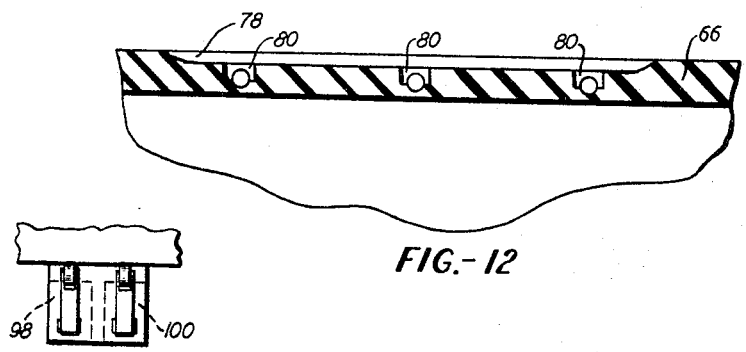
FIG.-12
FIG.-13

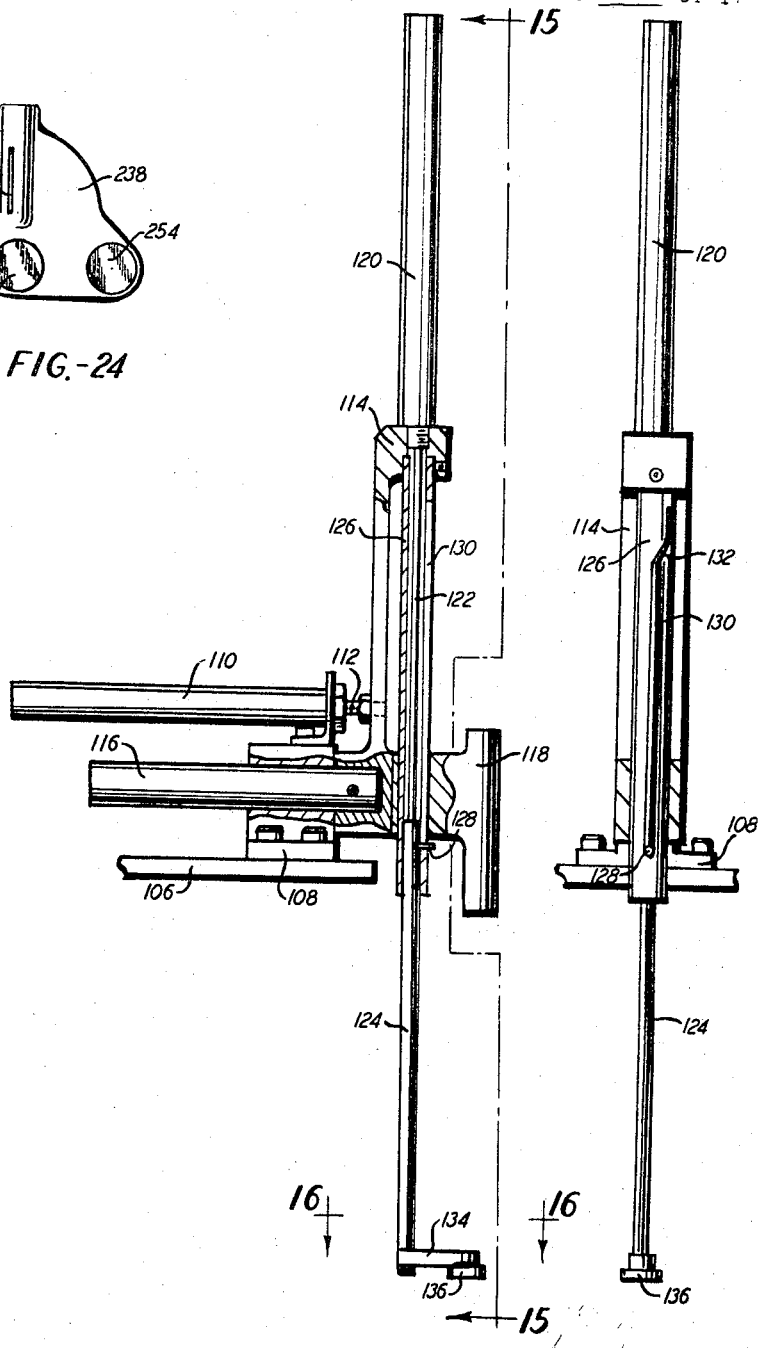

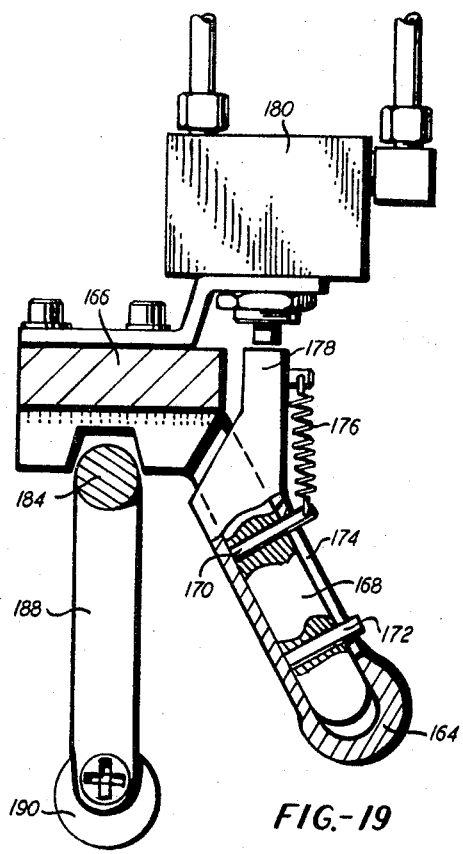
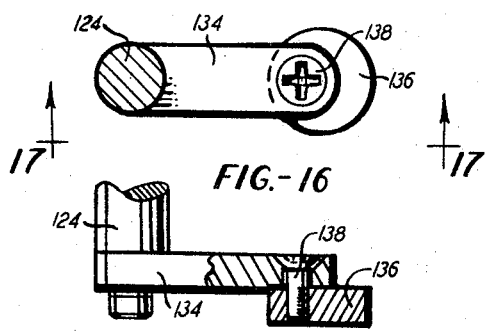

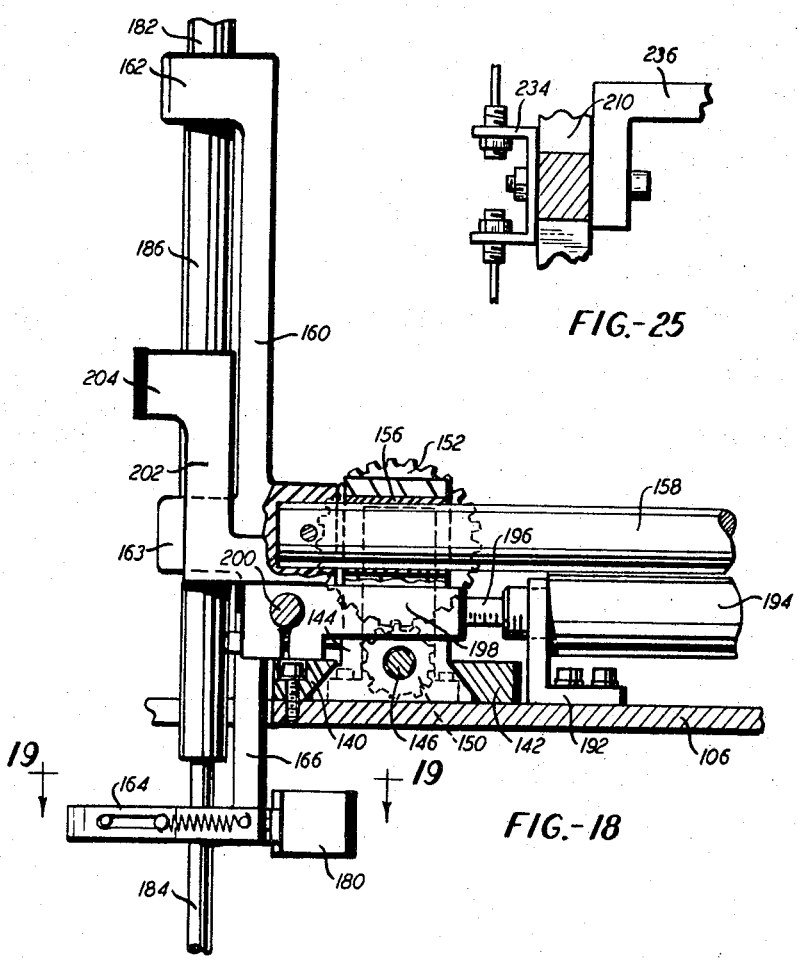

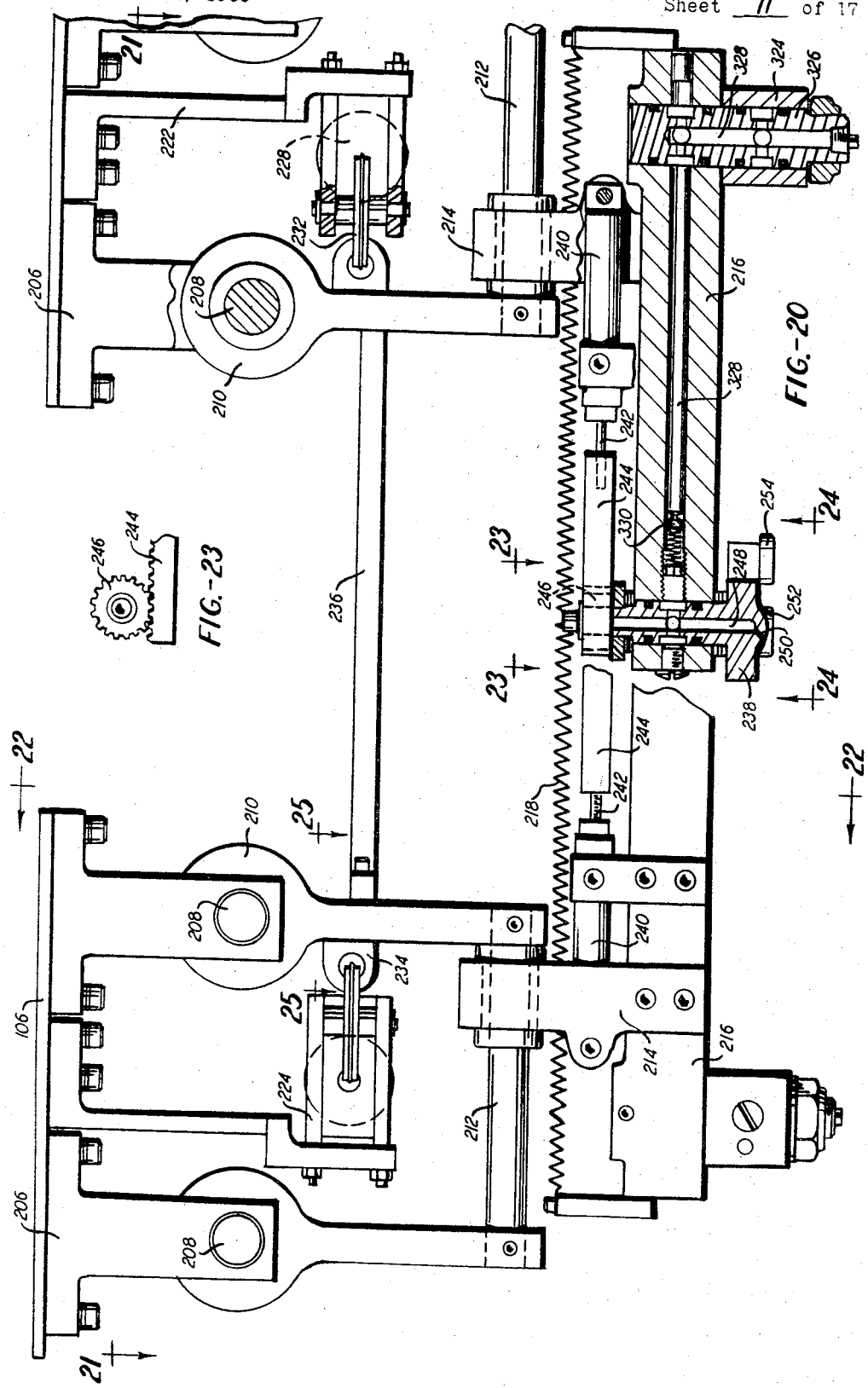

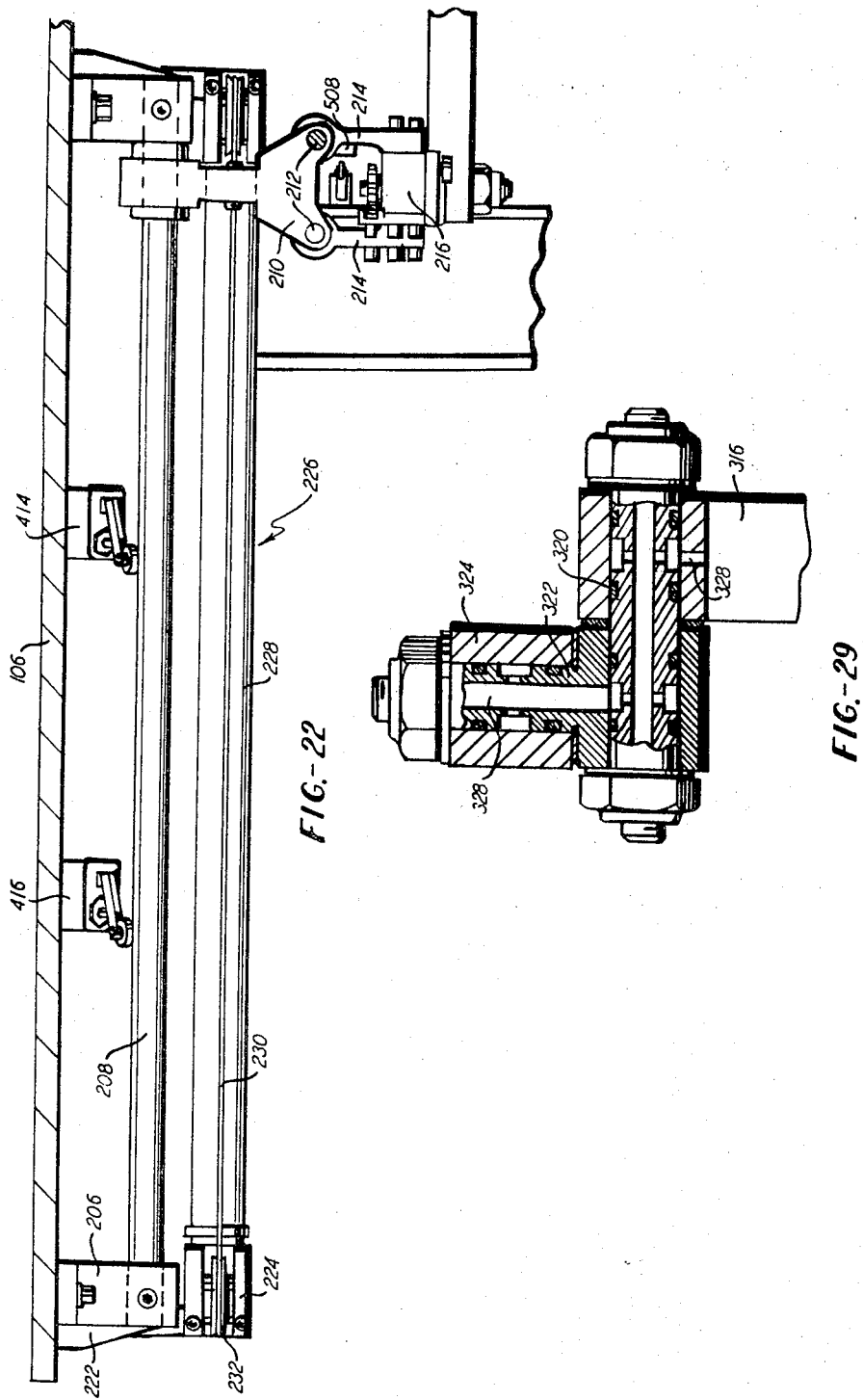

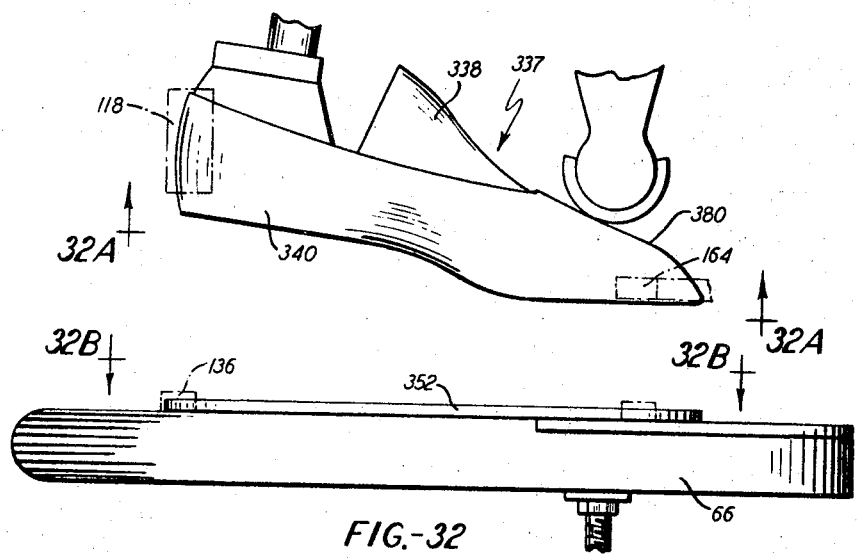
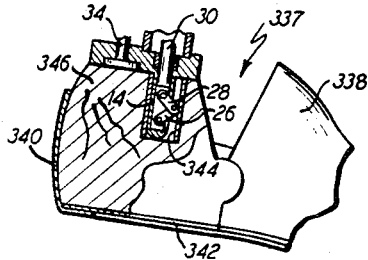
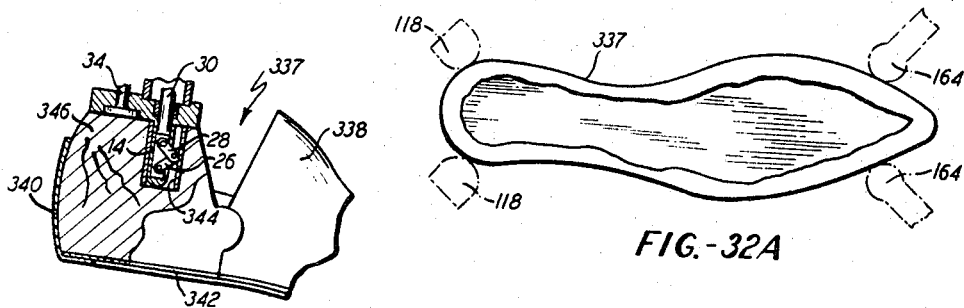
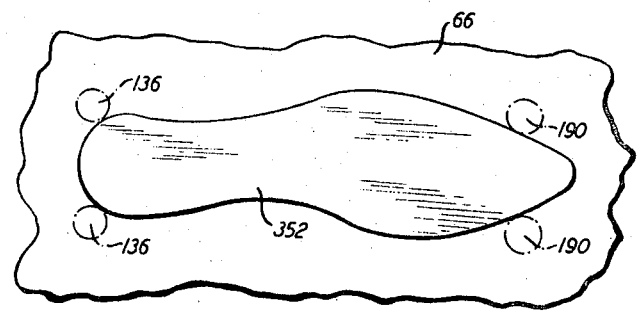
FIG.-32
FIG.-31
FIG.-32A
FIG.-32B

United States Patent Office 3,436,780
Patented Apr. 8, 1969

3,436,780
APPLICATION OF A SOLE TO THE BOTTOM OF A SHOE ASSEMBLY
Peter P. Spolsino, Revere, Mass., assignor to Jacob S. Kamborian, Boston, Mass.
Filed Oct. 18, 1965, Ser. No. 497,102
Int. Cl. A43d 25/00, 44/00
U.S. Cl. 12—142            39 Claims

ABSTRACT OF THE DISCLOSURE

There is disclosed herein a machine that includes an arrangement for holding a shoe assembly, that comprises a last having an upper mounted thereon secured to an insole located on the last bottom, in a bottom-down position, an arrangement for placing an outsole below the shoe assembly in aligned relationship with the bottom of the shoe assembly, an arrangement for applying cement to the outsole, and an arrangement for pressing the outsole to the bottom of the shoe assembly to thereby cementitiously attach the outsole to the bottom of the shoe assembly.

---

An aspect of this invention relates to the attaching of a sole to the bottom of a shoe assembly. In the illustrative embodiment of the invention, the "shoe assembly" is disclosed as being a last having an upper mounted thereon that has been secured to an insole located on the last bottom and the "sole" is an outsole that it is desired to secure to the bottom of the upper-insole assembly. However, the invention may be utilized with other types of shoe assemblies and soles, as, for example, in an arrangement wherein the "shoe assembly" is a naked last and the "sole" is an insole that it is desired to secure to the bottom of the naked last preparatory to mounting an upper on the last and wiping the upper margin against the bottom of the insole. In accordance with this invention, the sole is attached to the bottom of the shoe assembly by placing the sole in aligned relationship with the bottom of the shoe assembly, imparting closing movement between the shoe assembly and the sole while the aligned relationship is maintained to bring the surfaces to be attached into juxtaposed relationship and then pressing the sole against the bottom of the shoe assembly.

Another aspect of the invention relates to an arrangement for locking a last to a last pin so that a working operation may be performed on a work part mounted on the last. The last includes the conventional socket adapted to receive the last pin and the last pin has associated therewith a locking means that is actuable to cooperate with the socket to lock the last pin to the socket. A central is provided that is actuable in response to the placement of the last on the last pin to actuate the locking means.

A further aspect of the invention relates to the pressing of the sole against the bottom of the shoe assembly. Cement is provided on at least one of the two surfaces that are to be pressed against each other. The sole is supported on a hollow bladder below the shoe assembly and the shoe assembly is so mounted that a specified portion of its bottom is lower than the remainder of the shoe assembly bottom. The bladder is caused to close relative to the shoe assembly to enable the bladder to force the sole against said shoe assembly bottom portion to thereby attach the sole to said portion by way of the cement. After this the bladder is expanded to force the entire sole against the shoe assembly bottom.

Figure 1:
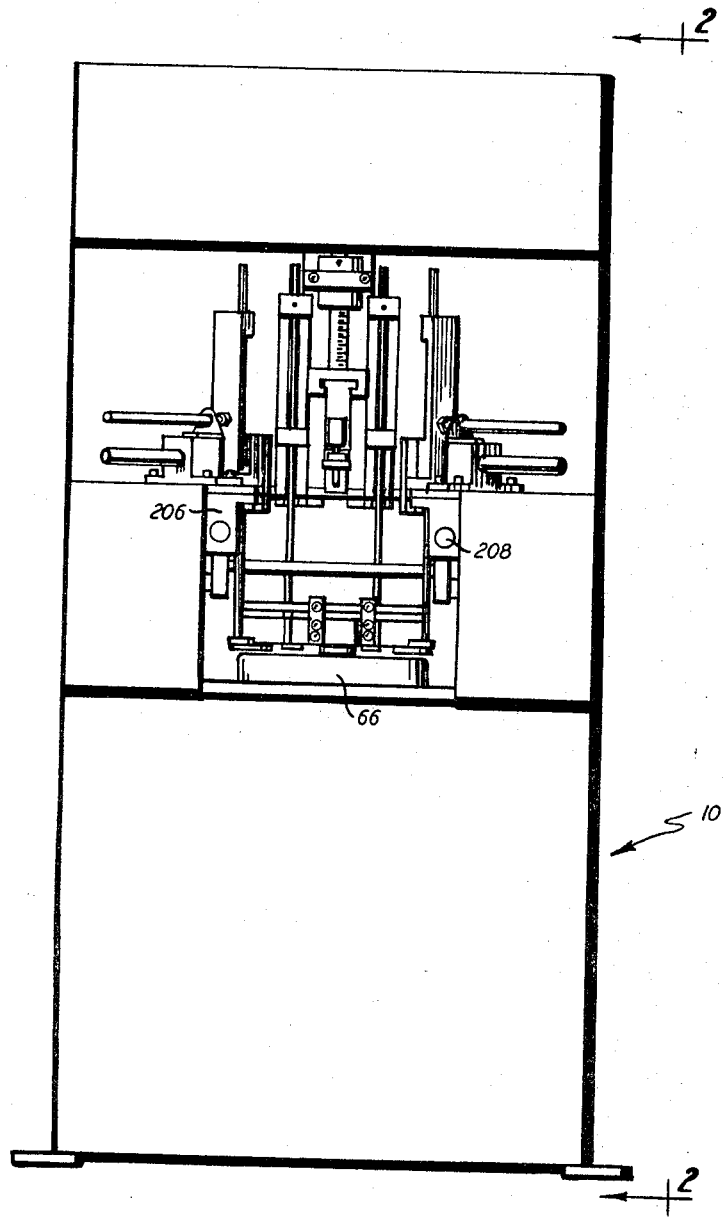
Figure 2:
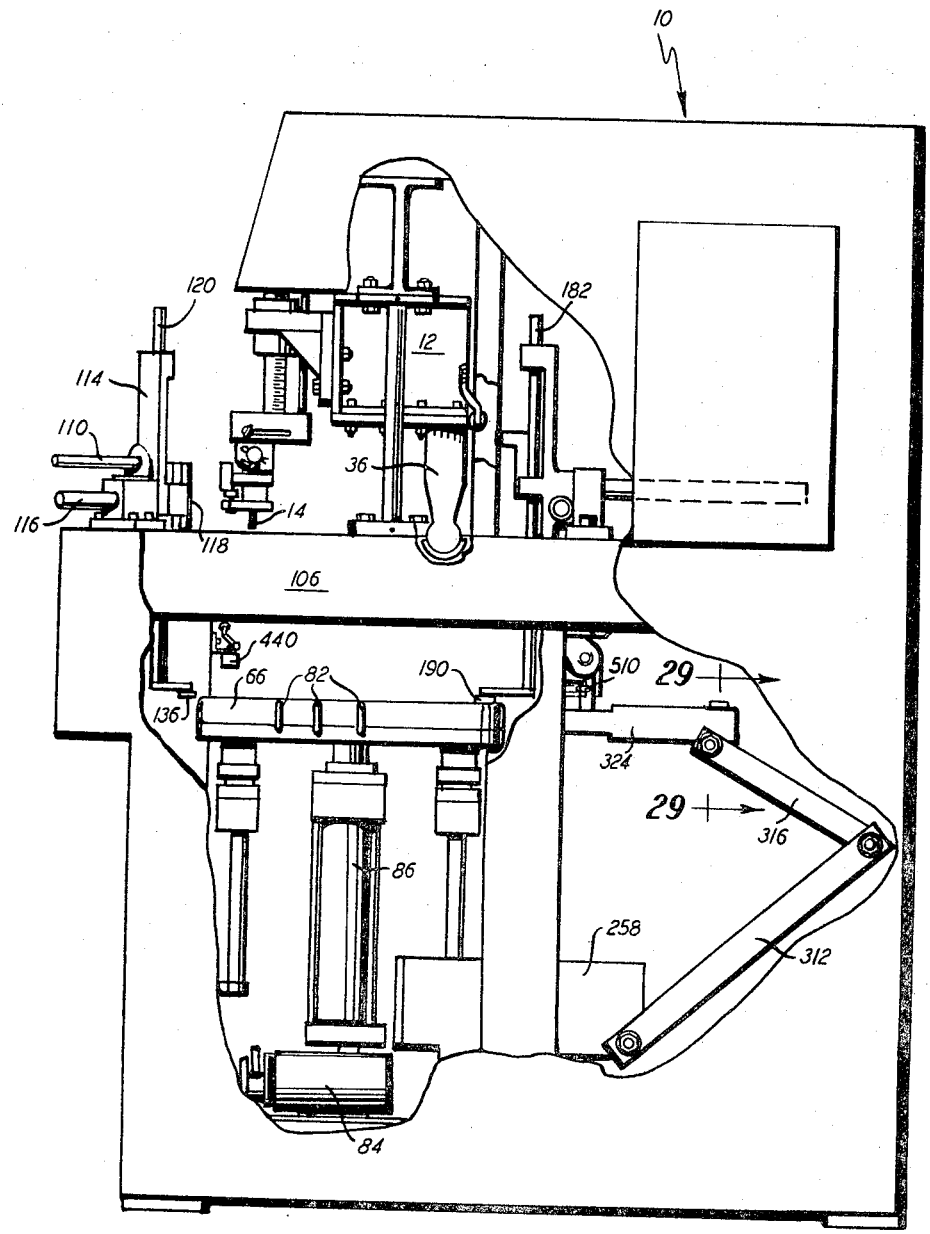
Figure 3:
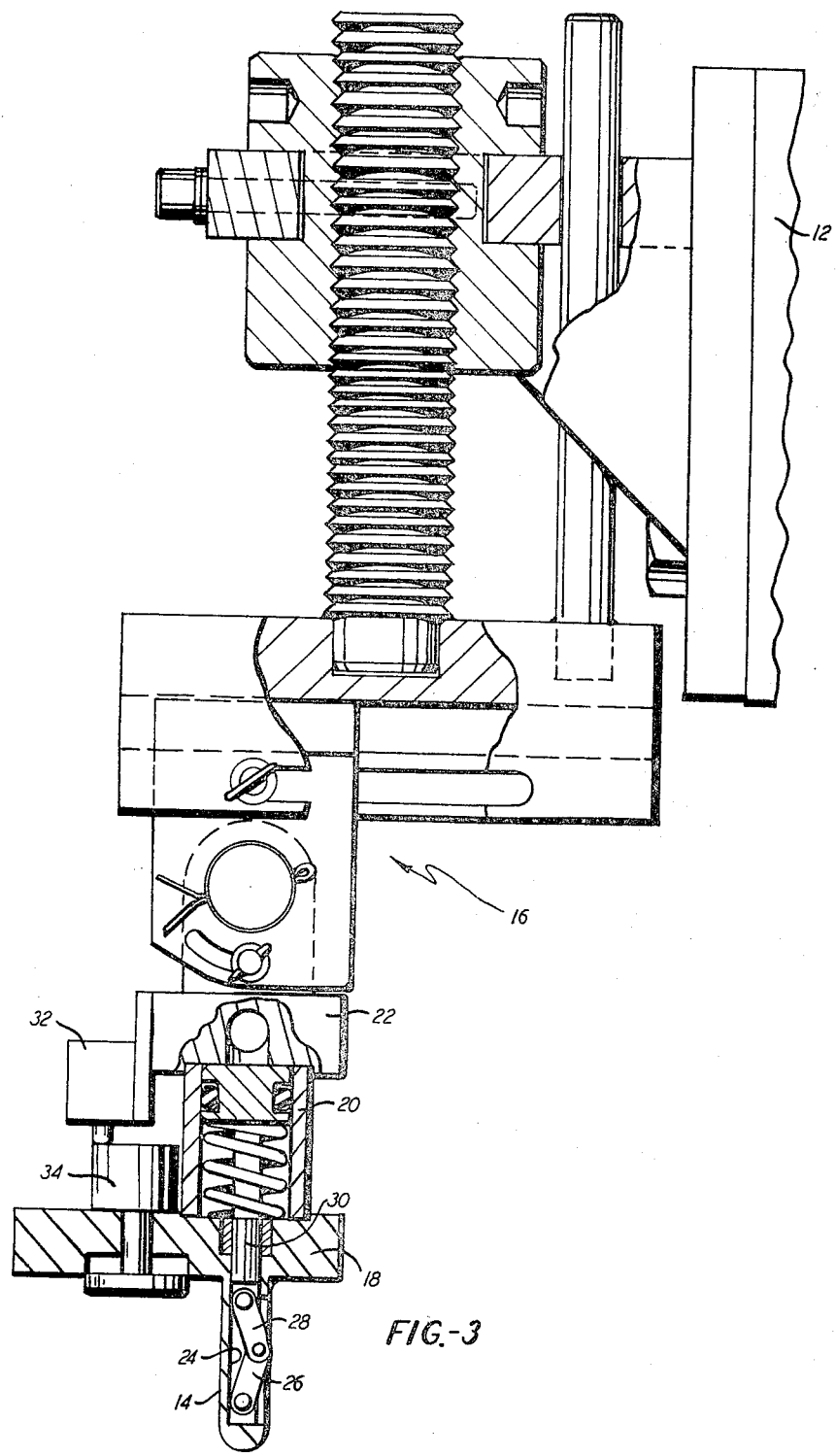
Figure 21:
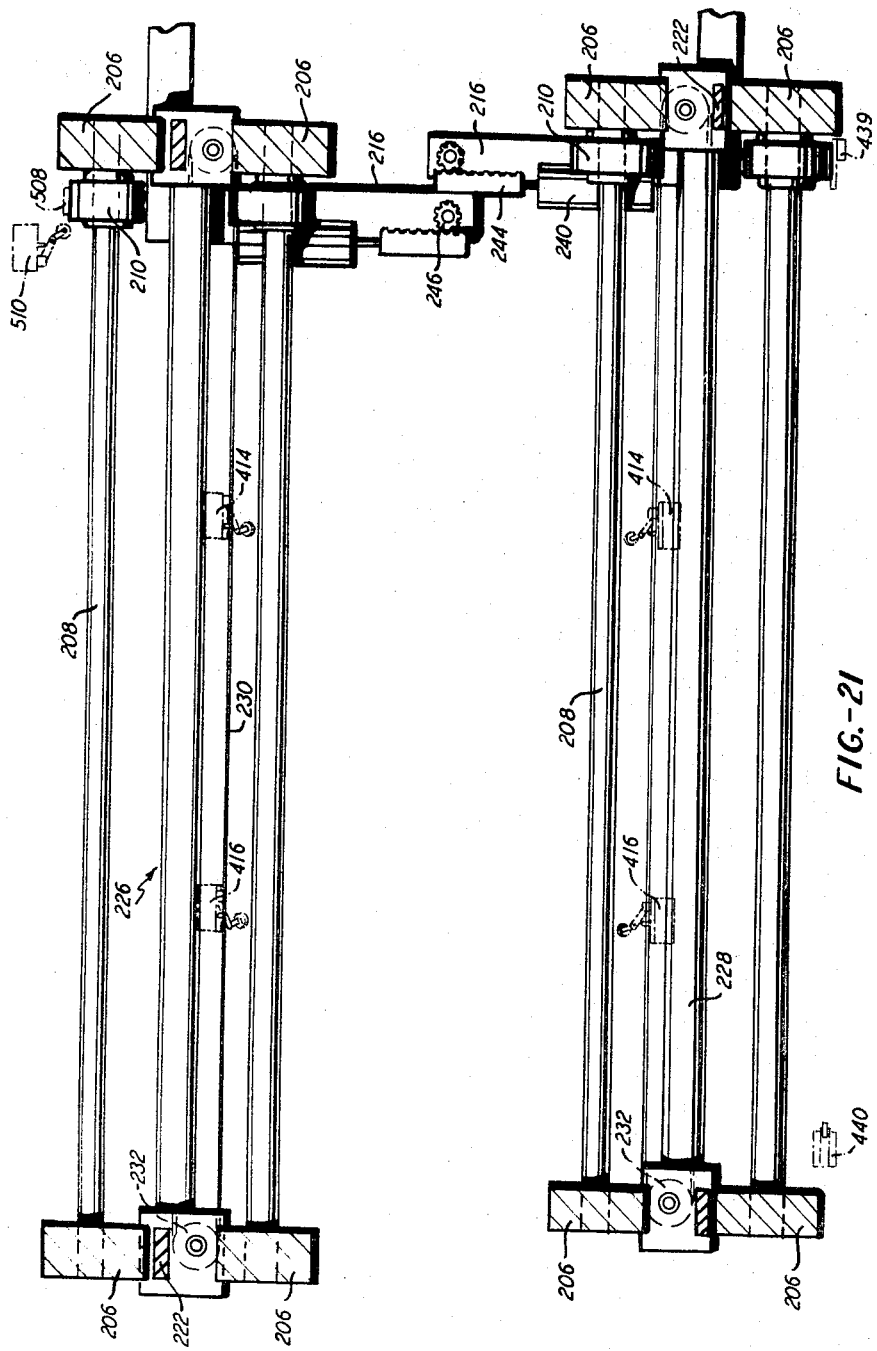
Figure 26:
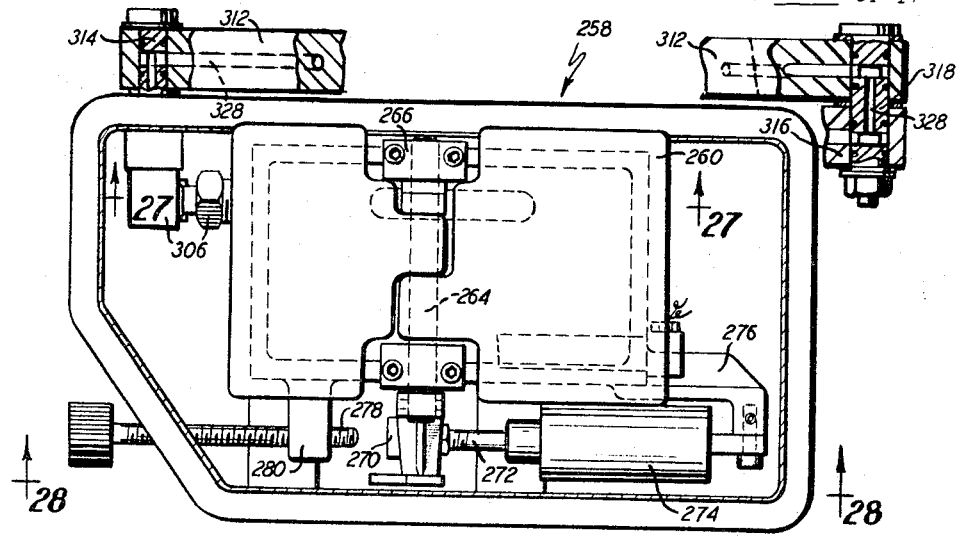
Figure 28:
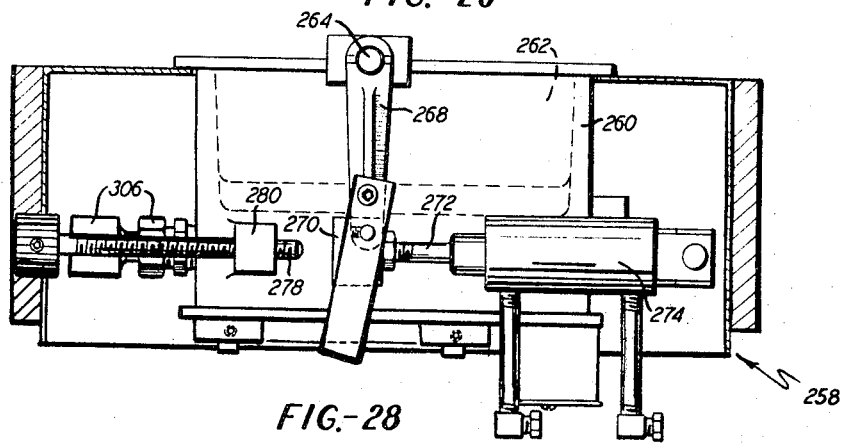
Figure 27:
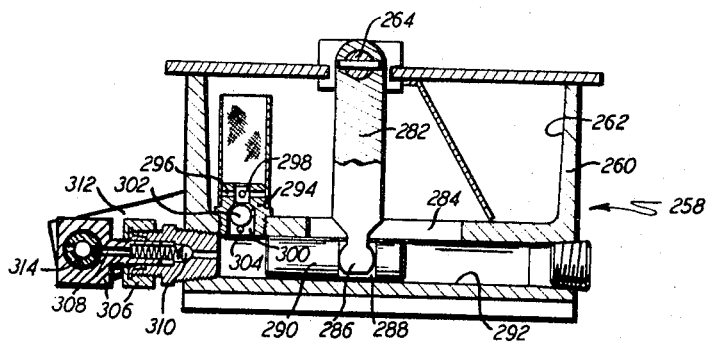
Figure 30:
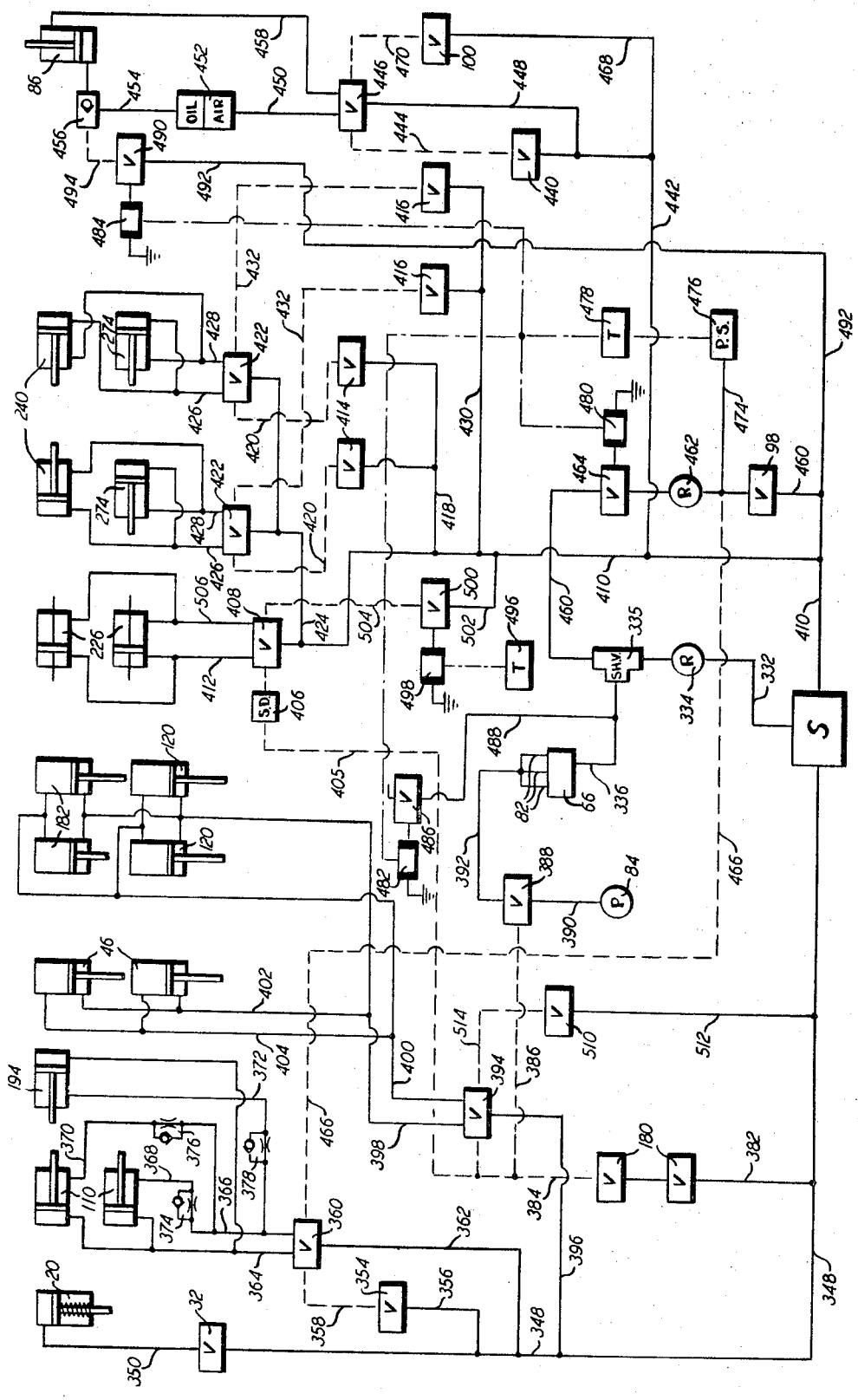
Figure 35:
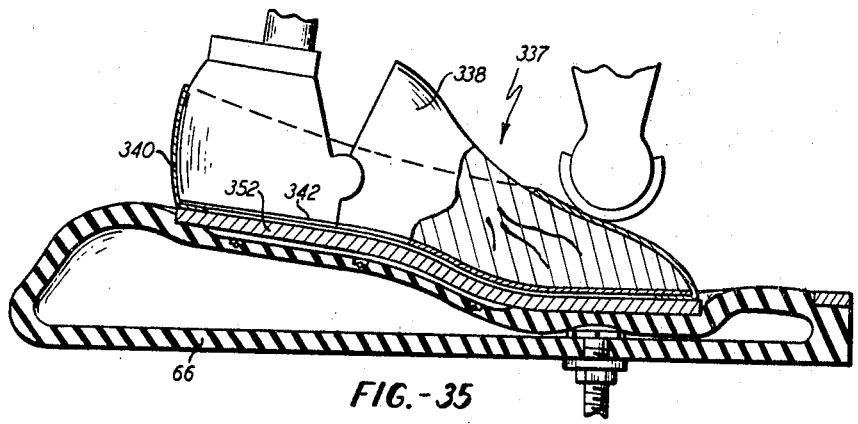
Figure 34:
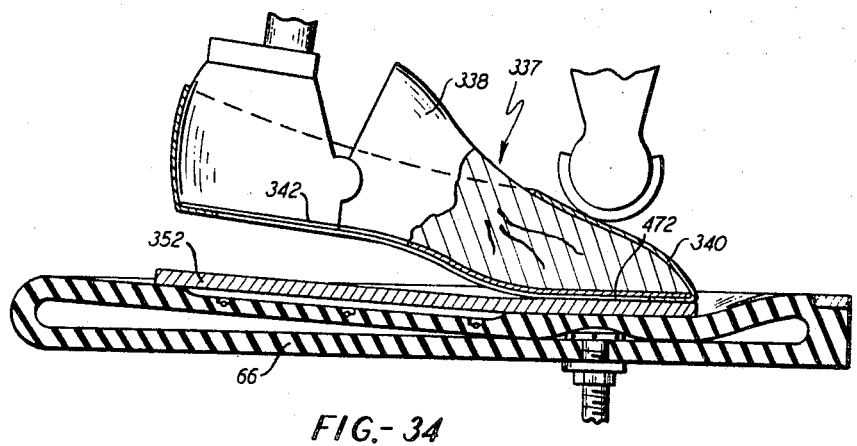
Figure 33:
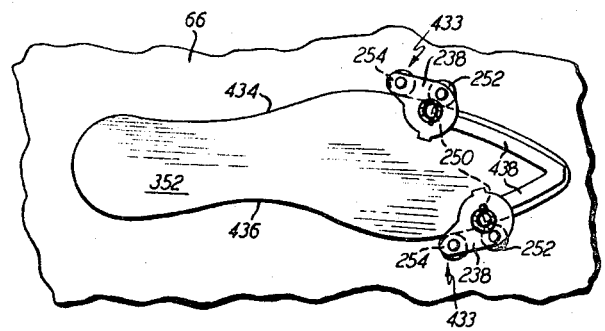

In the drawings:
FIGURE 1 is a front elevation of a machine for practicing the invention;
FIGURE 2 is a side elevation of the machine taken on the line 2—2 of FIGURE 1;

FIGURE 3 is an elevation, partly in section, of an arrangement for locking a last to a last pin that forms a part of the machine;
FIGURE 4 is a side elevation view of a toe pad that forms a part of the machine;
FIGURE 5 is a section taken on the line 5—5 of FIGURE 4;
FIGURE 6 is a view taken on the line 6—6 of FIGURE 5;
FIGURE 7 is a view taken on the line 7—7 of FIGURE 6;
FIGURE 8 is a view taken on the line 8—8 of FIGURE 6;
FIGURE 9 is a view taken on the line 9—9 of FIGURE 4;
FIGURE 10 is a plan view of the bladder and of a mechanism for shifting the sole on the bladder into aligned relationship with the bottom of the shoe assembly;
FIGURE 11 is an elevation taken on the line 11—11 of FIGURE 10;
FIGURE 12 is a section, to an enlarged scale, taken on the line 12—12 of FIGURE 10;
FIGURE 13 is a view taken on the line 13—13 of FIGURE 11;
FIGURE 14 is a view taken on the line 14—14 of FIGURE 10;
FIGURE 15 is a view taken on the line 15—15 of FIGURE 14;
FIGURE 16 is a view taken on the line 16—16 of FIGURE 15;
FIGURE 17 is a view taken on the line 17—17 of FIGURE 16;
FIGURE 18 is a view taken on the line 18—18 of FIGURE 10;
FIGURE 19 is a view taken on the line 19—19 of FIGURE 18;
FIGURE 20 is an elevation of the mechanism for applying cement to the sole that forms a part of the machine;
FIGURE 21 is a view taken on the line 21—21 of FIGURE 20;
FIGURE 22 is a view taken on the line 22—22 of FIGURE 20;
FIGURE 23 is a view taken on the line 23—23 of FIGURE 20;
FIGURE 24 is a view taken on the line 24—24 of FIGURE 20;
FIGURE 25 is a view taken on the line 25—25 of FIGURE 20;
FIGURE 26 is a plan view of a cement pot that forms a part of the cement applying mechanism;
FIGURE 27 is a view taken on the line 27—27 of FIGURE 26;
FIGURE 28 is a view taken on the line 28—28 of FIGURE 26;
FIGURE 29 is a view taken on the line 29—29 of FIGURE 2;
FIGURE 30 is a diagram of the control circuit of the machine;
FIGURE 31 is a representation of the locking arrangement for locking the last to the last pin;
FIGURE 32 is a representation in elevation showing the locating of the sole on the bladder in aligned relationship with the bottom of the shoe assembly;
FIGURE 32A is a view taken on the line 32A—32A of FIGURE 32;
FIGURE 32B is a view taken on the line 32B—32B of FIGURE 32;
FIGURE 33 is a representation of the application of the cement to the sole;
FIGURE 34 is a representation of the bladder at the time it has forced the sole against the lowermost portion of the shoe assembly; and FIGURE 35 is a representation of the bladder after it has expanded to force the entire sole against the bottom of the shoe assembly.

Referring to FIGURES 1 and 2, the machine is generally designated by the number 10. The operator is intended to stand to the left of the machine as seen in FIGURE 2. A direction extending toward the operator (right to left in FIGURE 2) will be designated as forward and a direction extending away from the operator (left to right in FIGURE 2) will be designated as rearward.

A beam 12, rigidly mounted in the machine, has a downwardly depending last pin 14 adjustably secured thereto by the mounting arrangement 16 shown in FIGURE 3. The last pin 14 extends downwardly of a plate 18. A spring return air actuated motor 20 extends upwardly of the plate and is secured to the plate 18 and a bracket 22 that forms part of the arrangement 16 and is located above the motor 20. The last pin 14 has a cut-out 24, and a toggle link 26 is pivoted within the cut-out at its lower end. The upper end of the toggle link 26 is pivoted to the lower end of a toggle link 28 and the upper end of the toggle link 28 is pivoted to the piston rod 30 of the motor 20. A valve 32, mounted on the bracket 22, is in alignment with a button 34 that is movably mounted in the plate 18 for heightwise movement. The button 34 is normally out of engagement with the valve 32 but may be raised to actuate the valve in the manner described below.

Referring to FIGURES 4–9, a toe pad 36 is mounted in the bottom of the beam 12 for forward and rearward movement between a stationary gib 38 that is rigidly secured to the beam and a movable gib 40. The gib 40 is loosely mounted on bolts 42 that pass through slots 44 in the gib, the slots being larger than the diameters of the bolts, see FIGURE 7. A pair of air actuated motors 46, mounted on the beam 12, have downwardly depending piston rods 48 that are pivoted to bell crank levers 50. The mid-portion of each lever 50 is pivoted between a pair of trunnions 52 formed on the beam 12, and each lever 50 extends downwardly of its associated trunnions 52 into an L-shaped cut-out 54 formed in the gib 40 wherein it is press-fitted onto a pin 56 that is located between walls in the gib 40 that bound the cut-out 54. Thus, lowering of the piston rods 48 by the motors 46 will move the gib 40 outwardly to permit movement of the toe pad 36 between the gibs 38 and 40 and raising of the piston rods 48 by the motors 46 act to move the gib 40 inwardly to lock the toe pad 36 between the gibs 38 and 40. In the idle condition of the machine the gib 40 is in its outer position and the toe pad 36 is urged rearwardly to the FIGURE 4 position by a coil spring 58 that is mounted on a hanger 60 depending from the beam 12 and that has an end secured to the toe pad 36 by a screw 62 (FIGURE 5). A washer 64, bolted to the rear end of the beam 12, is in alignment with the toe pad 36 and thereby serves to limit the extent of rearward movement of the toe pad in the beam under the influence of the spring 58 to the FIGURE 4 position wherein the toe pad depends from the rear end of the beam.

Referring to FIGURES 10–13, a support in the form of a bladder 66 is located below the last pin 14 and toe pad 36. The bladder, which is hollow and is made of a flexible, deformable material such as rubber, lies on a plate 68. A rim 70 extends about the rear portion of the upper margin of the bladder. Screws 72 extending through the rim and bladder and threaded into the plate 68 serve to secure the bladder to the plate. A port 74 provides communication between a hollow 76 within the bladder and a source of air under pressure. The upper surface of the bladder has a longitudinally extending cut-out 78 that is in communication with a plurality of ducts 80, and the ducts 80 are in communication with lines 82 that lead to a vacuum pump 84 (FIGURE 2).

A fluid actuated motor 86, secured to the machine frame below the plate 68, has an upwardly extending piston rod 88 that is secured to the plate 68 to thereby raise and lower the plate and the bladder in response to actuation of the motor 86. The plate 68 has bars 90 and 92 depending therefrom that are slidable in sleeves 94 secured to the machine frame to thereby guide the bladder for vertical movement. A cam 96, at the bottom of the bar 90, is in alignment with a pair of valves 98 and 100 that are secured to the machine frame. A tang 102, depending from the plate 68, is in alignment with an electric switch 104 that is secured to the machine frame.

Referring to FIGURES 10 and 14–19, the machine frame includes a table 106 that extends about the bladder 66. A bracket 108 is secured to the table 106 forwardly of and on each side of the bladder 66. An air actuated motor 110 is mounted in each bracket 108, and the piston rod 112 of each motor 110 is secured to a housing 114. A bar 116, pinned to each housing 114, is slidably received in a hole in its associated bracket 108. The motors 110 and bars 116 are so oriented as to enable the housings 114 and the below described parts carried by the housings 114 to move rearwardly and inwardly towards the bladder 66 or forwardly and outwardly away from the bladder in response to actuations of these motors. Each bracket 114 has a heel last locator 118 thereon that faces inwardly and rearwardly in the general direction of the last pin 14. An air actuated motor 120, mounted on each housing 114, has a downwardly extending piston rod 122. The bottom of each piston rod 122 is secured to a bar 124, and each bar 124 is slidable in a sleeve 126 that is secured to its associated housing 114. A pin 128, projecting radially of each bar 124, is received in a slot 130 formed in associated sleeve 126. The slots 130 are vertical for most of their extent but are offset at their upper portions 132. A bar 134 is secured to the bottom of each bar 124 and a heel sole locating disc 136 is eccentrically mounted on each bar 134 by means of a screw 138. When the discs 136 are in their lower position as shown in FIGURES 14 and 15, they are in vertical alignment with the locators 118. During a rise of the discs 136, caused by actuation of the motors 120, the pins 128 riding in the offset portions 132 of the slots 130 cause the bars 134 and discs 136 to swing laterally before they would engage the locators 118 and then move above the bottoms of the locators so that they are no longer in vertical alignment with the locators as shown in FIGURE 10.

As shown in FIGURES 10 and 18, there is mounted on the table 106, rearwardly of the bladder 66, a pair of transversely extending gibs 140 and 142 between which are slidably mounted a pair of spaced blocks 144. A shaft 146, rotatably mounted in trunnions 148 secured to the table 106, has right hand threads screwed into one of the blocks 144 and left hand threads screwed into the other of the blocks 144. A gear 150, at an end of the shaft 146, is in mesh with a gear 152 that is rotatably mounted in one of the trunnions 148. A knob 154 is attached to the gear 152 whereby rotation of the knob will move the blocks 144 and the parts carried thereby toward and away from each other. Each block 144 contains a bushing 156 that slidably receives a bar 158. A housing 160 is pinned to the forward end of each bar 158. Each housing 160 includes an upper flange 162 and a lower flange 163. A toe last locator 164 is mounted on a hanger 166 depending from each housing 160, the locators 164 extending in directions that are forward and inward of their associated housings 160.

As shown in FIGURE 19, each locator 164 is slidably mounted on a prong 168 that is secured to a hanger 166. Pins 170 and 172, fixed to each prong 168 are received in a slot 174 in each locator 164 to slidably guide the locators 164 for movement along the prongs 168. A tension spring 176, extending between each pin 170 and a lug 178 on each locator 164, acts to yieldably urge the locators forwardly on their associated prongs 168 to the extent permitted by the slots 174. A valve 180, mounted on each hanger 166, is in alignment with each lug 178 and is normally out of engagement with the lug.

An air actuated motor 182 is secured to and extends upwardly of each flange 162.

The piston rod 184 of each motor 182 extends through a sleeve 186 that is anchored to its associated flanges 162 and 163. As shown in FIGURES 10 and 19, a bar 188 is secured to and extends forwardly of each piston rod 184. A toe sole locating disc 190 is eccentrically mounted on each bar 188 similarly to the mounting of the heel sole locating discs 136 on the bars 134. A slot (not shown) is provided in each sleeve 186 that is cooperative with a pin secured to each piston rod 184 similar to the pin and slot arrangement 128, 130 described above in connection with the toe locators 118 and 136. These slots also have offset portions similar to the aforementioned offset portions 132 so that the discs 190 in their lowered position are in vertical alignment with the locators 164 and an actuation of the motors 182 to raise these discs causes the bars 188 and discs 190 to swing laterally before they would engage the locators 164 and then move above the bottoms of the locators 164 so that they are no longer in vertical alignment with these locators as shown in FIGURES 10 and 19.

Referring to FIGURES 10 and 18, an angle 192 is secured to the table 106 between the blocks 144. An air actuated motor 194, mounted on the angle 192, has a forwardly extending piston rod 196 that is secured to a block 198. A laterally extending bar 200, secured to the block 198, extends through holes in the housings 160. A pusher member 202, secured to the block 198, has a flange 204 that is in alignment with the toe pad 36 (see FIGURE 4). Thus actuation of the motor 194 will cause the members 164, 190 and 204 to move forwardly or rearwardly in unison.

Referring to FIGURES 20-22, eight hangers 206 are secured to and depend from the table 106. The hangers support four parallel bars 208 that extend longitudinally of the machine with two of the bars on each side of the bladder 66. The set of hangers 206 and bars 208 on one side of the table 106 are longitudinally offset from the set of hangers 206 and bars 208 on the other side of the table 206 as indicated in FIGURE 21. A carriage 210 is slidably mounted on each of the bars 208 for movement between the hangers 206 and a pair of cross-bars 212 extend between and are secured to each set of carriages 210. A hanger 214 is slidably mounted on and depends from each cross-bar 212 and a transversely extending carrier 216 is secured to each set of hangers 214 so that movement of the hangers 214 along the cross-bar 212 will cause inward and outward movement of the carriers 216 to the extent permitted by the engagement of the hangers 214 with the inner and outer ends of its associated carriages 210. A tension spring 218 secured to the two carriers 216 serves to yieldably urge the carriers inwardly to the position shown in FIGURES 20 and 21. The carriers 216 are offset from each other as indicated in FIGURE 21.

A bracket 222 extends downwardly of the table 106 between each pair of hangers 206 and a mount 224 is secured to each bracket 222. An air actuated motor 226 is secured to and extends between a pair of brackets 222 on each side of the machine. Each motor 226 comprises a cable cylinder 228 having a conventional piston (not shown) movable therein. A cable 230 is secured to each side of the piston, and each cable is trained about a pulley 232 that is rotatably mounted in a mount 224. Each inner carriage 210 has an angle 234 secured thereto, and the ends of each cable 230 remote from its associated piston is anchored to an angle 234 (FIGURE 25). A brace 236 extends between and is secured to the two inner carriages 210 (FIGURES 20 and 25). Thus, actuation of the motors 226 will cause the carriages 210, the carriers 216 and the parts carried thereby to move forwardly or rearwardly in unison with the brace 236 insuring that they maintain the offset relationship shown in FIGURE 21 during this movement.

A nozzle 238 (FIGURES 20 and 24) is rotatably mounted in the inner end of each carrier 216. An air actuated motor 240 is mounted in each carrier 216. The piston rod 242 of each motor 240 is secured to a rack 244, and each rack 244 is in mesh with a pinion 246 that is pinned to its associated nozzle 238 (FIGURE 23). Each nozzle has a vertical conduit 248 that extends along the axis of rotation of the nozzle and that is in communication with an elongated orifice 250 in the bottom of the nozzle. Follower means taking the form of a back follower roller 252 and a front follower roller 254 are rotatably mounted on the bottom of each nozzle to extend below the bottom of the orifice and outwardly of the orifice.

The machine incorporates a pair of cement extruding mechanisms similar to that shown in pending application Ser. No. 472,525, filed July 16, 1965. The extruding mechanisms 258 are located on opposite sides of the machine, only one of these being shown in the drawings (see FIGURES 2 and 26–28), each of the extruding mechanisms being used to force cement through a port 250. Each extruding mechanism 258 comprises a cement pot 260 that is secured to the frame of the machine. A well 262 is provided in the pot 260 that is bounded by the walls of the cement pot. A shaft 264, extending transversely over the well, is rotatably mounted in a pair of trunnions 266 that are secured to the cement pot walls. A lever 268, secured to the shaft 264 to extend downwardly of the exterior of the cement pot, is secured to a block 270. The block 270 is secured to the piston rod 272 of an air operated motor 274, and the motor 274 is pivoted to a flange 276 that is secured to the cement pot 260. A stop stud 278, that is threaded into a lug 280 of the cement pot, is in alignment with the block 270. A lever 282 is pinned to the shaft 264 and extends downwardly thereof into the well 262 through a slot 284 in the floor of the well. A prong 286 at the bottom of the lever 282 extends into a clevis 288 formed in a plunger 290, and the plunger is slidably mounted in a bore 292 located in the cement pot below the well 262. A ferrule 294 is threaded in a hole in the floor of the well forwardly of the lever 282. The ferrule has radial passages 296 that intersect a centrally located small diameter passage 298. The passage 298 opens into a large diameter passage 300, the passage 300 intersecting the bore 292. A ball 302, resting on a pin 304 extending across the passage 300, is cooperative with the passage 298 to act as a valve in the manner described below.

An adapter 306 is threaded into the cement pot at the forward end of the bore 292. A passage 308 extending through the adapter is normally blocked by a spring pressed ball valve 310 (FIGURE 27). The front end of a link 312 is pivotally mounted on one end of a bar 314 whose other end is secured in the adapter 304 (FIGURES 2, 26 and 27). As shown in FIGURES 2 and 26, the rear end of the link 312 and the rear end of a link 316 are pivoted on a bar 318. As shown in FIGURES 2 and 29, the front end of the link 316 is pivoted on a bar 320 and the bar 320 has a hub 322 on which is pivoted a forwardly extending link 324, thereby forming a universal joint between the links 316 and 324. As shown in FIGURE 20, the link 324 is pivoted on a bar 326 that is secured to a carrier 216. A conduit arrangement 328 extends between the passage 308 in the adapter 306 and the conduit 248 in the nozzle 238 to which the carrier is attached so that cement may flow, as described below, from the adapter to the nozzle. A spring pressed ball valve 330 in the carrier 216 serves to block the flow of the cement in the carrier 216 towards the nozzle 238 in the absence of pressure in the conduit arrangement 328.

As aforesaid, two extruding mechanisms 258 are provided in the machine, and the connection disclosed above between one extruding mechanism and one nozzle 238 is duplicated between the other extruding mechanism and the other nozzle.

In the idle condition of the machine: the motor 20 is in the FIGURE 3 position so that the toggle links 26, 28 are drawn into the last pin 14; the piston rods 48 are projected from the motors 46 so that the toe pad 36 is not locked between the gibs 38 and 40 and the toe pad bears against the washer 64 in the FIGURE 4 position; the piston rod 86 is retracted into the motor 88 so that the bladder 66 is in its lower position; the piston rods 112 are retracted into the motor 110, the piston rods 122 are projected from the motors 120, the piston rods 184 are projected from the motors 182, and the piston rod 196 is retracted into the motor 194 so that the heel sole locating discs 136 and the toe sole locating discs 190 are in lowered position just above the bladder 66 and are in an outward position with respect to the bladder; the motors 226 are so conditioned that the carriers 216 and nozzles 238 are in a rearward position; the piston rods 242 are retracted into the motors 240; and the piston rods 272 are retracted into the motors 274 so that the plungers 290 are in the FIGURE 27 position.

Before causing the machine to operate on the shoe parts to be treated, thermoplastic cement is placed in the wells 262 of the two extruding mechanisms 258 where it is melted and gravitates through the passages 296, 298 and 300 into the bores 292 between the plunger 290 and the adapters 306. The machine is then caused to go through a plurality of cycles, as described below, to thereby reciprocate the plungers 290 a number of times to cause the molten cement to flow past the valves 310, and through the conduit arrangements 328 until it is blocked by the valves 330 in the carriers 216.

The machine control incorporates the system that is schematically represented in FIGURE 30 wherein pressure lines are shown as solid lines, pilot lines are shown as dashed lines and electric lines are shown in chained lines. The system includes a source of air pressure labelled S from which air normally flows through a line 332, a low pressure regulator 334, a shuttle valve 335, a line 336 and the ports 74 (FIGURE 11) into the bladder 66 under relatively low pressure sufficient to maintain the upper surface of the bladder horizontal and prevent it from sagging. The shuttle valve is a standard commercial item having two inlet ports and one exit port and is so constructed that the air flowing out of the exit port has a pressure that corresponds to the higher of the pressures of the air entering the inlet ports.

The vacuum pump 84 is operating when the machine is in use but, in the idle condition of the machine, there is no suction force in the ducts 80. At the beginning of the machine cycle, the operator grasps a shoe assembly 337 that comprises a last 338 (FIGURE 31) having an upper 340 that has previously been lasted by the margin of the upper having been wiped against and fastened to an insole 342 that is located on the last bottom. The last pin receiving socket 344 of the last is placed on the last pin 14 with the toe of the last facing rearwardly toward the toe last locaters 164 and the heel of the last facing forwardly toward the heel last locaters 118. The last is then raised to cause the cone 346 of the last to raise the button 34 to thereby shift the valve 32. Shifting of the valve 32 enables pressurized air to pass from the source S through a line 348, the valve 32 and a line 350 to the motor 20 to actuate this motor to lower its piston rod 30 and thereby swing the toggle links 26, 28 outwardly and cause them to bear against the inner periphery of the socket 344 to thereby lock the last 338 in place on the last pin 14 as indicated in FIGURE 31.

At this time, or earlier, an outsole 352 is deposited by the operator on the bladder 66 so that it covers the ducts 80 and is roughly in alignment with the shoe assembly 337. The operator now shifts a manually actuable valve 354 which enables pressurized air to pass from the line 348 through a line 356, the valve 354 and a pilot line 358 to a valve 360 to shift the valve 360. After the valve 360 has been shifted, the operator releases the valve 354 as the valve 360 is so constructed that after it has been shifted due to the pressurized air in the line 358, it remains in shifted position. In response to the shifting of the valve 360, pressurized air passes from the line 348, through a line 362, the valve 360 and a line 364 to the motors 110 and 194 to actuate these motors to move their piston rods inwardly toward the bladder 66 and last 338. Prior to the shifting of the valve 360, the motors 110 and 194 had been maintained in their idle conditions by pressurized air passing from the line 362 through the valve 360, a line 366 and lines 368, 370 and 372, the lines 368 and 370 each leading to a motor 110 and the line 372 leading to the motor 194. Flow control valves 374, 376 and 378 are respectively provided in the lines 368, 370 and 372 to control the rate of egress of the air through these lines to the valve 360 where the air is vented to atmosphere in response to the shifting of the valve 360. The flow control valves are so adjusted that the air egresses through the line 372 at a slower rate than through the lines 368 and 370 with the result that the piston rod of the motor 194 is moved at a slower rate than the piston rods of the motors 110 in response to the shifting of valve 360.

The shifting of the valve 360 therefore results in the piston rods 112 of the motors 110 moving the heel last locaters 118 convergently in a rearward direction until the locaters 118 bear against the shoe assembly 337 as indicated in FIGURES 32 and 32A. Since the heel sole locaters 136 at this time are in vertical registry with the heel last locaters 118, the rearward movement of the piston rods 112 of the motors 110 also causes the locaters 136 to move across the top of the bladder 66 and engage the heel portion of the outsole 352, as indicated in FIGURES 32 and 32B, until the heel last locaters 118 stop their movement. The shifting of the valve 360 therefore also results in the piston rod 196 of the motor 194 moving forwardly until the locaters 164 bear against the toe of the shoe assembly as indicated in FIGURES 32 and 32A. Since the toe sole locaters 190 are at this time in vertical registry with the toe last locaters 164, the forward movement of the piston rod 196 of the motor 194 also causes the locaters 190 to move across the top of the bladder 66 and engage the toe portion of the outsole 352, as indicated in FIGURES 32 and 32B until the sole last locaters 164 stop their movement. The eccentric mountings of the discs 136 on the bars 134 and the discs 190 on the bars 188 enable the sole locaters to be adjusted to ensure their being in the desired vertical registry with the last locaters so that at the completion of the movements of the sole locaters the outsole 352 will have been shifted on the bladder into the proper registry with the shoe assembly bottom for the outsole applying operation described below. The spacing of the toe locaters 164 and 190, to accommodate these locaters to the particular shape and size of outsole acted on may be adjusted by manipulating the knob 154.

Due to the settings of the flow control valves 374, 376 and 378 the toe locaters move more slowly than the heel locaters so that the shoe assembly and outsole are engaged first by the heel locaters and then by the toe locaters with the sole locaters cooperating to shift the outsole on the bladder into registry with the shoe assembly. The resistance to movement of the last toe locaters 164 caused by their engagement against the shoe assembly, at which time the outsole is in registered position due to the last toe locaters engaging the shoe assembly after the last heel locaters 118 have engaged the shoe assembly, causes the last toe locaters 164 to move rearwardly on the prongs 168 to thereby shift the valves 180 to produce the results described below.

In addition to moving the toe locaters forwardly, the motor 194 also moves the pusher member 202 forwardly so that it engages the toe pad 36 and moves it forwardly between the gibs 38 and 40 against the resistance of the spring 58 until the movement of the pusher member is terminated by the engagement of the toe last locators 164 with the shoe assembly. During this movement of the toe pad it rides along the upper surface 380 (FIGURE 32) of the forepart of the shoe assembly and may therefore depress this portion of the shoe assembly. However, there is sufficient clearance between the last pin 14 and the last socket 344 (see FIGURE 31) as to permit this last depression to take place with the toggle links 26, 28 and piston rod 30 yielding during the last depression sufficiently to accommodate the changed position of the last. As a result the toe pad is located above and bears against the top of the forepart of the shoe assembly regardless of the length of the shoe assembly.

The shifting of the valves 180 causes pressurized air to flow from the line 348 through a line 382, the valves 180 and pilot lines 384 and 386 to a valve 388 to open this valve. The opening of the valve 388 enables the vacuum pump 84 to provide a suction force in the cut-out 78 in the top of the bladder 66 by providing communication between the vacuum pump 84, a line 390, the valve 388, a line 392, the lines 82 (FIGURE 10), the ducts 80 and the cut-out 78 to thereby apply a force to hold the outsole 352 on the bladder in the position in which it had been placed by the sole locators 136 and 190.

The shifting of the valves 180 also causes pressurized air to flow through the pilot line 384 to shift a valve 394. Shifting of the valve 394 enables pressurized air to flow from the line 348 through a line 396, the valve 394 and a line 398 to the motors 120 and 182 to actuate these motors to raise the heel sole locators 136 and toe sole locators 190 to a level that is higher than the bottom of the shoe assembly 337 so that the sole locators will be out of the way during the cement applying and sole pressing operations described below. As described above, the sole locators are swung laterally during their rise so that they will not interfere with the shoe assembly 337 or the last locators 118 and 164. Prior to the shifting of the valve 394, the sole locators 139 and 190 had been maintained in their lower positions by pressurized air passing from the line 396 through the valve 394 and a line 400 to the motors 120 and 182.

The shifting of the valve 394 also enables pressurized air to pass from the line 398 through a line 402 to the motors 46 to actuate these motors to move the gib 40 inwardly and thus lock the toe pad 36 in the position to which it had been moved by the pusher member 202. Prior to the shifting of the valve 394, the motors 46 had been maintained in condition to urge the gib 40 outwardly by pressurized air passing to these motors from the line 400 through a line 404.

The shifting of the valves 180 also enables pressurized air to pass through the pilot line 384, a pilot line 405 and a sequencing device 406 to shift a valve 408. Shifting of the valve 408 enables pressurized air to pass from the source S through a line 410, the valve 408 and a line 412 to the motors 226 to actuate these motors to move the carriers 216 and nozzles 238 forwardly. The sequencing device 406 is a conventional item that delays the passage of the pressurized air to the valve 408 so that it is not shifted until the other valves actuable in response to the shifting of the valve 180 have been shifted. Therefore the carriers 216 and nozzles 238 commence their forward movement after the suction has been applied to hold the outsole 352 on the bladder 66, the sole locaters 136 and 190 have been raised and the toe pad 36 has been locked in position.

Referring to FIGURES 21 and 22, a valve 414 and a valve 416 are adjustably mounted in the table 106 and are located in registration with each of the inner carriages 210 so that during the forward movement of each carrier 216 and nozzle 238 a valve 414 is momentarily shifted and then a valve 416 is momentarily shifted. The valves 414 and 416 have conventional one way actuators so that they are not shifted during the subsequent rearward movement of the carriers 216 and nozzles 238. An example of a valve having a one way actuator is shown in FIGURE 6 of pending application Serial No. 410,566 filed Nov. 12, 1964.

The momentary shifting of the valves 414 causes pressurized air to flow from the line 410 through the line 418, from the line 418 through the two valves 414 and from each of the valves 414 through a pilot line 420 to shift a valve 422. The shifting of the valves 422 causes pressurized air to flow from the line 410 through a line 424 and from the line 424 through the two valves 422. From each valve 422, the pressurized air passes through a line 426 to actuate the motors 274 to move the piston rods 272 forwardly from the FIGURE 28 position and to actuate the motors 240 to move the piston rods 242 inwardly from the idle position. Prior to the shifting of the valves 414 the motors 274 and 240 had been maintained in their idle position by pressurized air passing to these motors from the line 424 through the valves 422 and lines 428.

The momentary shifting of the valves 416 causes pressurized air to pass from the line 410 through a line 430 and from the line 430 through each of the valves 416. From each of the valves 416 pressurized air passes through a pilot line 432 to a valve 422 to thereby shift the valves 422 to their original positions and thus cause the motors 274 and 240 to be returned to their original conditions.

The valves 414 are so located as to be shifted when their associated nozzles 238 arrive at the toe end of the outsole 352 which is now held down against the bladder 66 by the suction force emanating from the ducts 80 and the valves 416 are so located as to be shifted when their associated nozzles 238 arrive at the heel end of the outsole 352.

During the forward movement of the carriers 216 they are resiliently urged towards each other and towards the outsole 352 by the spring 218. When each carrier 216 arrives at the toe end of the outsole 352 the actuation of its associated motor 274 due to the shifting of the valve 414 causes the plunger 290 to move forwardly (FIGURE 27) to thereby force the ball 302 against and close the passage 298 and enable the plunger movement to unseat the valves 310 and 330 (FIGURE 20) so that molten cement is forced from the conduit 328, through the conduit 248 of the nozzle 238 and then through the nozzle port 250 onto the outsole. The arrival of each carrier 216 at the toe end of the outsole 352, due to the shifting of the valve 414, and the actuation of its associated motor 240, also causes the nozzle 238 to swing about its vertical axis in the directions indicated by the arrows 433 in FIGURE 33 so as to resiliently urge each front roller 254 inwardly towards the periphery of the outsole 352. Due to the spring 218, the rollers 252 and 254 are caused to resiliently bear against the peripheries of the outsole 352 during their forward movement. In addition, the inward urging of the front rollers 254 in the directions of the arrows 433 ensures that the rollers will bear against all of the outsole periphery during their travel including the reentrant portions indicated by numerals 434 and 436 in FIGURE 33. During this travel of the nozzles along the outsole periphery, a ribbon 438 of cement is deposited by each nozzle on the outsole. The ribbons 438 have a width determined by the width of the nozzle orifices 250 (FIGURE 24) and are spaced inwardly of the outsole periphery a distance determined by the distance between the nozzle orifices 250 and the back rollers 252. When the carriers 216 pass the heel end of the outsole 352, the shifting of the valves 416 cause the motors 274 to retract the plungers 290 to enable the valves 310 and 330 to be reseated and to terminate the deposition of the cement and cause the motors 240 to return to their initial positions to terminate the resilient urging of the front rollers 254 in the directions of the arrows 433. The carriers 216 and nozzles 238 are longitudinally offset so that they will not interfere with each other during their travel along the outsole periphery. By having the motors 240 urge the front rollers 254 outwardly until they are in position to engage the outsole, it is assured that each roller 254 will bear against and follow along that side of the outsole 352 that is closest to the side of the machine from which the carrier 216 of that roller extends.

The rate of travel of the plungers 290 are so related to the time interval between the shifting of the valves 414 and 416 that the blocks 270 (FIGURE 28) will be retracted before they can engage the studs 278, and the studs 278 merely serve to define the maximum amount of travel of the plungers 290. If desired the studs 278 may be eliminated.

Towards the end of the forward movement of the carriers 216 and the nozzles 238, a cam 439, that is secured to one of the carriages 210, momentarily shifts a valve 440, having a one way actuator, that is mounted on the machine frame 10 (see FIGURES 2 and 21). The momentary shifting of the valve 440 enables pressurized air to flow from the line 410 through a line 442, the valve 440 and a pilot line 444 to shift a valve 446. The shifting of the valve 446 enables pressurized air to flow from the line 442, through a line 448, the valve 446 and a line 450 to an air-oil tank 452. The tank 452 is a standard commercial item so constructed that the flow of the presusrized air into it through the line 450 causes hydraulic oil to egress from it through a line 454. The oil in the line 454 passes through a check valve 456 and into the motor 86 to actuate this motor to raise the bladder 66, together with the now cemented outside 352, against the bottom of the shoe assembly 337. Prior to the shifting of the valve 446 the motor 86 had maintained the bladder 66 in its lowered position by pressurized air passing from the line 448 through the valve 446 and a line 458 to the motor 86.

The valves 98 and 100 (FIGURE 13) are opened by the cam 96 (FIGURE 11) near the end of the rise of the bladder 66. The opening of the valve 98 enables pressurized air to pass from the line 410 through a line 460, the valve 98, a high pressure regulator 462 and a normally open valve 464 to the shuttle valve 335 to admit pressurized air into the bladder 66 by way of the shuttle valve and the line 336 under higher pressure than had heretofore entered the bladder through the shuttle valve by way of the line 332 and the regulator 334.

The opening of the valve 98 also enables the pressurized air passing through the valve 98 to flow through a pilot line 466 to the valve 360 to shift this valve back to its original position and thus actuate the motors 110 and 94 to move the last locators 118 and 164 outwardly of and away from the shoe assembly 337. The movement of the toe last locators 164 away from the last enables the springs 176 (FIGURE 19) to move the lugs 170 away from the valves 180 so that these valves can shift to their normally closed positions. The closure of the valves 180 (a) shuts off the flow of air through the pilot line 386 to the valve 388 so that the valve 388 closes and shuts off the suction force to the bladder 66 through the line 392, (b) shuts off the flow of pressurized air through the line 404 to the valve 408 that controls the operation of the motors 226, and (c) shuts off the flow of pressurized air through the line 384 to the valve 394 that controls the operation of the motors 46, 120 and 182.

The opening of the valve 100 enables pressurized air to flow from the line 442 through a line 468, the valve 100 and a pilot line 470 to the valve 446 to shift this valve back to its original position and thus terminate the flow of pressurized air in the line 450 and the upward movement of the bladder 66. However, the bladder 66 does not descend at this time because the oil in the motor 86 cannot egress from this motor through the line 454 due to its being blocked by the check valve 456.

Recapitulating the event that take place near the end of the rise of the bladder 66, the rising bladder 66 is pressed against the forepart 472 (FIGURE 34) of the shoe assembly bottom which is the lowermost portion of the shoe assembly bottom and the upper and lower walls of the bladder are squeezed against each other and force the outsole 352 against the shoe assembly bottom portion 472 to thereby adhere the outsole to the shoe assembly bottom by way of the cement ribbons 438. At about this time, the rise of the bladder is terminated, the suction force retaining the outsole on the bladder is terminated and high pressure air is admitted into the bladder to expand its upper walls against the bottom of the shoe assembly as indicated in FIGURE 35. The expansion of the upper bladder wall causes pressure to be applied by the outsole to the bottom of the shoe assembly to thereby enable the outsole to be secured to the bottom of the shoe assembly by way of the cement ribbons 438. This pressure is released, as described below, after it has been maintained for a time sufficient for the thermoplastic cement ribbons 438 to cool and set. The initial attachment of the outsole to the forepart portion 472 of the shoe assembly bottom when the parts are in the FIGURE 34 position prevents the outsole from shifting with respect to the shoe assembly bottom and maintains the outsole in registry with the shoe assembly bottom when the bladder 66 is expanded from the FIGURE 34 to the FIGURE 35 position. It is desirable to discontinue the application of the suction force by way of the ducts 80 and cut-out 78 to the shoe assembly bottom during this expansion as the upper wall of the bladder and the cut-out 78 is stretched and distorted during this expansion and this stretching and distortion, if the suction force were maintained, would force the outsole out of registry with the shoe assembly bottom.

A pressure actuated switch 476 is in communication with the valve 98 by way of a line 474. The switch 476 is so set that it will close in response to the build up of a predetermined air pressure in the line 474 and this pressure is not reached until after the pressurized air passing through the lines 460 and 466 from the valve 98 have performed the functions described above. The closing of the pressure actuated switch 476 causes a timer 478 to be turned on. The timer 478 is electrically connected to solenoids 480, 482 and 484 in such a manner as to cause these solenoids to be energized a predetermined time after the timer is turned on. The timer 478 is a standard commercial item that may take the form shown in FIGURE 53A of pending application Ser. No. 472,525 filed July 16, 1965.

The energization of the solenoid 482 by the timer 478 causes the shifting of the valve 486 thereby enabling the pressurized air in the bladder 66 to be exhausted to atmosphere by way of line 336, a line 488 and the valve 486 to thereby deflate the bladder.

The energization of the solenoid 484 by the timer 478 causes the shifting of a valve 490. The shifting of the valve 490 enables pressurized air to flow from the line 410, a line 492, the valve 490 and a pilot line 494 to the check valve 456 thereby shifting the check valve and enabling the hydraulic oil in the motor 86 to flow back to the airoil tank 452 through the line 454 and thus enabling the piston rod 88 of the motor 86 and the bladder 66 to lower.

The energization of the solenoid 480 by the timer 478 causes the valve 464 to close and thus shut off the flow of high pressure air flowing into the bladder 66 by way of the valve 464, the line 460, the shuttle valve 335 and the line 336.

Thus, a predetermined time after the outsole 352 has been forced against the bottom of the shoe assembly 337, which time is of sufficient duration to enable the ribbons of cement 438 to permanently bond the outsole to the bottom of the shoe assembly, the bladder 66 is deflated and is lowered away from the shoe assembly 337.

Shortly before the motor 86 has caused the bladder 66 to return to its original lower position, the tang 102 (FIGURE 11) causes a momentary closing of the switch 104 which has a one way actuator. The closure of the switch 104 turns on a timer 496 that is similar to the timer 478 and after a predetermined time lapse the timer causes the energization of a solenoid 498. The energization of the solenoid 498 causes a normally closed valve 500 to shift to open position. The opening of the valve 500 enables pressurized air to pass from the line 410, through a line 502, the valve 500 and a pilot line 504 to shift the valve 408 back to its original position. This shifting of the valve 408 enables pressurized air to pass through the valve 408 and a line 506 to the motors 226 to actuate these motors to return the carriers 216 and nozzles 238 rearwardly to their original positions. The time lag caused by the timer 496 ensures that the bladder 66 is completely deflated and does not interfere with the carriers 216 and nozzles 238 during the rearward movement of the carriers and nozzles.

During the rearward movement of the carriers 216, a cam 508, secured to one of the carriages 210 momentarily opens a normally closed valve 510 that is attached to the machine frame 10 (see FIGURES 2 and 21) and has a one way actuator. The opening of the valve 510 enables pressurized air to pass from the line 348 through a line 512, the valve 510 and a pilot line 514 to the valve 394 to shift this valve to its original position. The shifting of the valve 394 enables pressurized air to pass through this valve and the line 400 to the motors 46, 120 and 182 to actuate these motors to thereby respectively move the gib 40 outwardly and thus unlock the toe pad 36 which is returned to its idle position by the spring 58, lower the heel sole locators 136 to their original positions and lower the toe sole locators 190 to their original positions.

At this time the operator removes the shoe assembly 337, with the outsole 352 cemented to its bottom, from the last pin 14 to complete the machine cycle. The removal of the shoe assembly from the last pin enables the button 34 to drop to its FIGURE 3 position which in turn enables the valve 32 to close. Closure of the valve 32 enables the return spring of the motor 20 to return this motor and the toggle links 26, 28 to their original positions. The force exerted on the last pin receiving socket 344 by the toggle links 26, 28 when these parts are in FIGURE 31 position is sufficiently weak as to enable the shoe assembly to be removed from the last pin.

Summarizing an operating cycle of the machine, the operator places the shoe assembly 337 on the last pin 14 to thereby automatically lock the shoe asembly on the last pin 14, as shown in FIGURE 31 and places an outsole 352 on the bladder 66 with the toe end of the outsole facing rearwardly. He then momemtarily shifts the valve 354 to cause the machine to go automatically through its cycle until the outsole has been secured to the bottom of the shoe assembly. This causes the heel locators 118 and 136 and the sole locators 164 and 190 to converge on the last and outsole until the last locators 118 and 164 have engaged the shoe assembly with the result that the sole locators 136 and 190 engage the outsole and move it into registry with the shoe assembly as indicated in FIGURES 32, 32A and 32B. During the movement of the toe locators the pusher member 202 moves the toe pad 36 forwardly above the forepart of the shoe assembly. In response to the engagement of the last toe locators 164 with the shoe assembly 337, the outsole 352 is held against movement of the bladder 66 by suction in the cutout 78, the sole locators 136 and 190 are moved upwardly out of engagement with the outsole and the toe pad 36 is locked in the position to which it had been moved by the pusher member 202. After this the carriers 216 and nozzles 238 are moved forwardly across the bladder and the nozzles are caused to traverse the periphery of the outsole 352 and apply the ribbons 438 of thermoplastic cerment thereto as indicated in FIGURE 33. This is followed by the raising of the bladder 66 against the bottom of the shoe assembly 337. Towards the end of the rise of the bladder, the upper bladder wall bears against the bottom of the forepart portion of the shoe assembly, as indicated in FIGURE 34, to thereby adhere the outsole 352 to this portion of the shoe assembly. This is followed by the termination of the upward movement of the bladder 66, the movement of the locators 118, 136, 164 and 190 away from the shoe assembly 337 to their original positions, the shutting off of the suction force in the cut-out 78 and the expansion of the bladder by the admittance of pressurized air thereto to apply upwardly directed pressure to the bottom of the shoe assembly against the downwardly directed force exerted by the plate 18 and toe pad 36, as indicated in FIGURE 35, to thereby cause the outsole 352 to conform to the shape of the bottom of the shoe assembly 337 and to be secured to the bottom of the shoe assembly by way of the cement ribbons 438. After the lapse of a predetermined time interval, the pressurized air in the bladder 66 is vented to atmosphere to enable the bladder to deflate and the bladder is lowered. After this the carriers 216 and nozzles 238 are returned to their initial rearward positions, the toe pad 36 is unlocked and returned to its original position and the sole locators 136 and 190 are returned to their original positions. The operator now removes the shoe assembly 337, with the outsole 352 secured thereto, from the last pin 14 to complete the machine cycle.

It should be understood that the present disclosure is for the purpose of illustration only and that this invention includes all modifications and equivalents that fall within the scope of the appended claims.

Terms in the claims indicating positions and paths of movement such as "below," "raising" and "rearward" have been employed primarily to define the relative positions and paths of movements of the parts and should be construed accordingly so that organizations which have equivalent relative positions and functional relationships between the parts as are defined in the claims are considered to fall within the scope of the claims regardless of whether the parts literally have the defined positions and paths of movements.

Terms in the claims indicating relative movement of one part with respect to another part have been employed to define this relative movement regardless of which of the two parts literally moves and should be construed accordingly, so that organizations which have a movement of either of the defined parts with respect to the other defined part for achieving the same result are considered to fall within the scope of the claims.

I claim:

1. An apparatus for attaching the upper surface of a sole to the bottom surface of a shoe assembly, said shoe assembly including a last on which an upper may be mounted, comprising: means mounting the shoe assembly bottom-down; a support located below the shoe assembly for supporting the sole; means for placing the sole on the support in aligned relationship with the shoe assem bottom; means for thereafter applying cement to at least one of said surfaces; means for thereafter imparting relative closing movement between the shoe assembly and the support while said aligned relationship is maintained to bring said surfaces into juxtaposed relationship; and means for thereafter pressing the sole against the shoe assembly bottom to thereby force said surfaces against each other and enable them to be attached to each other.

2. An apparatus for attaching the upper surface of a sole to the bottom surface of a shoe assembly, said shoe assembly including a last on which an upper may be mounted, comprising: means mounting the shoe assembly bottom-down; a support located spacedly below the shoe assembly for loosely supporting the sole; means for shifting the sole on the support until the sole is in aligned relationship with the shoe assembly bottom; means for thereafter applying a holding force to the sole to hold it on the support; means for thereafter raising the support, while the holding force is maintained, to bring said surfaces into juxtaposed relationship; and means for thereafter pressing the sole against the shoe assembly bottom to thereby force said surfaces against each other and enable them to be attached to each other.

3. The apparatus as defined in claim 2 further comprising: means for applying cement to the upper surface of the sole while said holding force is being applied and prior to the raising of the support.

4. The apparatus as defined in claim 2 wherein the means for shifting the sole on the support into aligned relationship with the shoe assembly bottom comprises: at least two last locators mounted for movement in convergent paths from outer positions that are outward of the shoe assembly inwardly toward the shoe assembly; a sole locator located below each last locator, the sole locators being so constructed and arranged as to be in heightwise registry with their associated last locators and to be mounted for movement in unison with the last locators in convergent paths toward the sole; and yieldable drive means for moving the last locators and their associated sole locators inwardly from said outer positions.

5. The apparatus as defined in claim 4 wherein the sole locators and the yieldable drive means are so constructed and arranged that a selected sole locator is the last sole locator to engage the sole; and further comprising: means responsive to the engagement of said selected sole locator with the sole, at which time the sole has been shifted into aligned relationship with the shoe assembly bottom, to actuate said means for applying the holding force to the sole.

6. The apparatus as defined in claim 5 wherein the support is a hollow bladder having a cut-out in its upper surface over which the sole is intended to lie and wherein the means for applying the holding force comprises means for applying a suction force through the cut-out to hold the sole against the bladder.

7. The apparatus as defined in claim 4 wherein one of said last locators is a toe last locator adapted to move toward the toe portion of the shoe assembly and its associated sole locator is a toe sole locator adapted to move toward the toe portion of the sole, and further comprising: a toe pad located above the shoe assembly and mounted for movement from an initial outer position forwardly along the longitudinal center line of the shoe assembly and inwardly of the toe end extremity of the shoe assembly; and means connected to the toe last locator and toe sole locator for moving the toe pad forwardly from its initial position whereby the toe pad is moved forwardly an amount corresponding to the extent of movement of the toe last locator and toe sole locator and the toe pad acts to restrain upward movement of the shoe assembly during the pressing of the sole against the shoe assembly.

8. The apparatus as defined in claim 7 further comprising: means for locking the toe pad in position after it has completed its forward movement.

9. The apparatus as defined in claim 2 wherein the support is a hollow bladder having a cut-out in its upper surface over which the sole is intended to lie and wherein the means for applying the holding force comprises means for applying a suction force through the cut-out to hold the sole against the bladder.

10. The apparatus as defined in claim 9 wherein the means for pressing the sole against the shoe assembly comprises means for expanding the bladder to force the sole against the bottom of the shoe assembly.

11. The apparatus as defined in claim 10 further comprising: means for terminating the application of the suction force concomitantly with the expansion of the bladder.

12. The apparatus as defined in claim 4 further comprising: means for moving the sole locators above the level of the bottom of the shoe assembly after they have shifted the sole into aligned relationship with the shoe assembly bottom so the sole locators will be out of interfering relationship with the support during the rise of the support and the pressing of the sole against the shoe assembly bottom.

13. The apparatus as defined in claim 12 wherein the sole locators and the yieldable drive means are so constructed and arranged that a selected sole locator is the last sole locator to engage the sole; and further comprising: means responsive to the engagement of said selected sole locator with the sole, at which time the sole has been shifted into aligned relationship with the bottom of the shoe assembly, for causing the means for raising the sole locators to be actuated.

14. The apparatus as defined in claim 4 further comprising: cement applying means operative to move along the top of the sole to apply the cement thereto while said holding force is being applied and prior to the raising of the support.

15. The apparatus as defined in claim 14 further comprising: means for raising the sole locators above the level of the bottom of the shoe assembly after they have shifted the sole into aligned relationship with the shoe assembly bottom so that the sole locators will be out of interfering relationship with the cement applying means during the movement of the cement applying means along the top of the sole and out of interfering relationship with the support during the rise of the support and the pressing of the sole against the shoe assembly bottom.

16. The apparatus as defined in claim 14 wherein the sole locators and the yieldable drive means are so constructed and arranged that a selected sole locator is the last sole locator to engage the sole; and further comprising: means responsive to the engagement of said selected sole locator with the sole, at which time the sole has been shifted into aligned relationship with the bottom of the shoe assembly, to cause the cement applying means to move along the top of the sole and apply cement thereto.

17. An apparatus for attaching the upper surface of a sole to the bottom surface of a shoe assembly, said shoe assembly including a last on which an upper may be mounted, comprising: means mounting the shoe assembly bottom down with its toe facing forwardly and its heel facing rearwardly; a support located spacedly below the shoe assembly for loosely supporting the sole; a beam located above the shoe assembly; a toe pad movably mounted for forward and rearward movement in the beam; means for yieldably urging the toe pad along the beam to an initial rearward position; a block located rearwardly of the sole and mounted for forward movement; a pusher member secured to the block for movement in unison therewith, said pusher member being in alignment with and rearward of the toe pad; at least one toe last locator secured to the block for movement in unison therewith, each toe last locator being in alignment with and forwardly of the toe portion of the shoe assembly; a toe sole locator located below each toe last locator, each toe sole locator being in alignment with and forwardly of the toe portion of the sole and being so constructed and arranged as to be in heightwise registry with and mounted for movement with its associated toe last locator; at least one heel last locator located outwardly of and in alignment with the heel portion of the shoe assembly; means mounting the heel last locator for movement toward the heel portion of the shoe assembly; a heel sole locator located below each heel last locator, each heel sole locator being in alignment with and outwardly of the heel portion of the sole and being so constructed and arranged as to be in heightwise registry with and mounted for movement with its associated heel last locator; yieldable drive means operative to move the block forwardly and to move the heel last and heel sole locators inwardly so that the last locators move until they bear against the last and their associated sole locators engage and shift the sole on the support to a position that is in aligned relationship with the shoe assembly bottom and the pusher member pushes the toe pad forwardly along the beam to a position above the forepart of the shoe assembly an amount that corresponds to the length of the shoe assembly; means for thereafter applying a holding force to the sole to hold it on the support; means for thereafter raising the support, while the holding force is maintained, to bring said surfaces into juxtaposed relationship; and means for thereafter pressing the sole against the shoe assembly bottom while the toe pad acts to restrain upward movement of the shoe assembly to thereby force said surfaces against each other and enable them to be attached to each other.

18. The apparatus as defined in claim 17 further comprising: means, operative when the sole has been shifted into aligned relationship with the shoe assembly bottom, to lock the toe pad in the beam in the position to which it had been pushed by the pusher member.

19. The apparatus as defined in claim 17 wherein the sole locators and the yieldable drive means are so constructed and arranged that a selected sole locator is the last sole locator to engage the sole; and further comprising: means responsive to the engagement of said selected sole locator with the sole, at which time the sole has been shifted into aligned relationship with the bottom of the shoe assembly, to lock the toe pad in the beam in the position to which it had been pushed by the pusher member.

20. The apparatus as defined in claim 19 further comprising: cement applying means mounted for movement from an intial position away from the sole through a path wherein it moves along the top of the sole to apply cement thereto; means mounting each of the sole locators for heightwise movement from its position of engagement with the sole to an upper position above the shoe assembly bottom; and means responsive to the engagement of said selected sole locator with the sole to actuate the said means for applying the holding force to the sole, to raise the sole locators to their upper positions and to cause the cement applying means to move through said path.

21. An apparatus for attaching the upper surface of a sole to the bottom surface of a shoe assembly, said shoe assembly including a last on which an upper may be mounted, comprising: means mounting the shoe assembly bottom-down; a support located spacedly below the shoe assembly for loosely supporting the sole; at least two housings mounted for movement in convergent paths from outer positions that are outward of the shoe assembly and sole inwardly toward the shoe assembly and sole; a last locator mounted on each housing in position to intersect the shoe assembly when moved in said path; a bar mounted for heightwise movement in each housing; a sole locator mounted on each bar in position to intersect the sole when moved in said path; means for initially positioning the bars in a lower position wherein each sole locator is in heightwise registry with its associated sole locator; yieldable drive means for moving the housings inwardly in said paths to thereby cause the last locators to bear against the shoe assembly and the sole locators to shift the sole on the support until the sole is in aligned relationship with the shoe assembly bottom; means for thereafer applying a holding force to the sole to hold it on the support; means for thereafter raising the bars an amount sufficient to raise the sole locators above the bottom of the shoe assembly; means for thereafter raising the support, while the holding force is maintained, to bring said surfaces into juxtaposed relationship; and means for thereafter pressing the sole against the shoe assembly bottom to thereby force said surfaces against each other and enable them to be attached to each other.

22. A last holding arrangement comprising: a last pin adapted to be received in a socket of a last; a locking means, associated with said pin, that is actuable to cooperate with the socket to lock the last pin to the socket; a control means positioned adjacent the last pin in such relationship to the last pin as to be intersected by the last during the placement of the last on the last pin; and actuating means responsive to the intersection of the control means by the last to actuate the locking means.

23. The arrangement as defined in claim 22 wherein: the control means comprises a button positioned alongside the last pin.

24. The arrangement as defined in claim 22 wherein the locking means comprises: a locking member that is movably mounted in the last pin for radial movement; means connected to the locking member to normally maintain the locking member in an inner position with respect to the last pin; and wherein the actuating means comprises: means for moving the locking member radially outward of the last pin.

25. The arrangement as defined in claim 22 wherein the last pin has a radial cut-out; wherein the locking means comprises a toggle linkage connected to the last pin within the cut-out and so constructed and arranged as to normally be located within the cut-out and to be actuable to be moved radially outward of the last pin.

26. A last locking arrangement comprising: a downwardly projecting last pin adapted to be received in a socket of a last; a rod mounted in the last pin for heightwise movement; means for normally urging the rod to an upper position; a locking means, connected to the rod and last pin, so constructed and arranged as to be in a radially inner position with respect to the last pin when the rod is in said upper position and to be forced radially outward of the last pin in response to downward movement of the rod; a control means positioned adjacent the last pin is such relationship to the last pin as to be intersected by the last during the placement of the last on the last pin; and actuating means responsive to the intersection of the control means by the last to move the rod downwardly and thereby force the locking means radially outward against the last socket.

27. The arrangement as defined in claim 26 wherein the control means and actuating comprises a motor operatively connected to the rod to effect its downward movement; a button, positioned alongside the last pin, mounted for heightwise movement from a lower position to an upper position, said button being so constructed and arranged as to normally be in its lower position; and means responsive to the raising of the button during the placement of the last on the last pin to activate the motor to move the rod downwardly.

28. A method of attaching the upper surface of a sole to the bottom surface of a shoe assembly by way of cement that is provided on at least one of said surfaces, said shoe assembly including a last on which an upper may be mounted comprising: mounting the shoe assembly bottom-down with a specified portion of the shoe assembly bottom located lower than the remainder of the shoe assembly bottom; supporting the sole spacedly below the shoe assembly on a hollow bladder; imparting relative closing movement between the bladder and the shoe assembly until the bladder has forced the sole against said shoe assembly bottom portion to thereby attach the sole to said portion by way of the cement; applying a holding force to the sole to hold the sole on the bladder in aligned relationship with the shoe assembly bottom during said closing movement; then expanding the bladder to force the entire sole against the shoe assembly bottom; and releasing the holding force concomitantly with the expansion of the bladder.

29. The method as defined in claim 28 wherein said holding force comprises: a suction force extending through a cut-out in the upper surface of the bladder that underlies the sole.

30. An apparatus for attaching the upper surface of a sole to the bottom surface of a shoe assembly by way of cement that is provided on at least one of said surfaces, said shoe assembly including a last on which an upper may be mounted, comprising: means mounting the shoe assembly bottom-down with a specified portion of the shoe assembly bottom located lower than the remainder of the shoe assembly bottom; a hollow bladder located spacedly below the shoe assembly bottom for supporting the sole; means for imparting relative closing movement between the bladder and the shoe assembly until the bladder has forced the sole against said shoe assembly bottom portion to thereby attach the sole to said portion by way of the cement; means effective to apply a holding force to the sole to hold the sole in aligned relationship with the shoe assembly during said closing movement; means for then expanding the bladder to thereby force the entire sole against the shoe assembly bottom; and means effective to release the holding force concomitantly with the operation of the means for expanding the bladder.

31. The apparatus as defined in claim 30: wherein the bladder has a cut-out in its upper surface that is adapted to underlie the sole; and the means effective to apply the holding force to the sole comprises means for applying a suction force through the cut-out.

32. An apparatus for attaching the upper surface of a sole to the bottom surface of a shoe assembly by way of cement that is provided on at least one of said surfaces, said shoe assembly including a last on which an upper may be mounted, comprising: means mounting the shoe assembly bottom-down with a specified portion of the shoe assembly bottom located lower than the remainder of the shoe assembly bottom; a hollow bladder located spacedly below the shoe assembly bottom for supporting the sole; means mounting the bladder for heightwise movement; means for applying a holding force to the sole to hold it on the bladder in aligned relationship with the shoe assembly bottom; means for raising the bladder, while the holding force is maintained, from a lower position wherein the sole is spaced from the shoe assembly bottom to an upper position wherein the bladder has forced the sole against said shoe assembly bottom portion to thereby attach the sole to said portion by way of the cement; and means operative upon arrival of the bladder at said upper position to concomitantly release the holding force and expand the bladder to thereby force the entire sole against the shoe assembly bottom.

33. The apparatus as defined in claim 32: wherein the bladder has a cut-out in its upper surface that is adapted to underlie the sole; and the means for applying the holding force to the sole comprises means for applying a suction force through the cut-out.

34. A method of attaching the upper surface of a sole to the bottom surface of a shoe assembly, said shoe assembly including a last on which an upper may be mounted, comprising: mounting the shoe assembly bottom-down; supporting the sole below the shoe assembly so that the sole is in aligned relationship with the shoe assembly bottom; thereafter applying cement to at least one of said surfaces; thereafter imparting relative closing movement between the shoe assembly and the sole while said aligned relationship is maintained to bring said surfaces into juxtaposed relationship; and thereafter pressing the sole against the shoe assembly bottom to thereby force said surfaces against each other and enable them to be attached to each other.

35. A method of attaching the upper surface of a sole to the bottom surface of a shoe assembly, said shoe assembly including a last in which an upper may be mounted, comprising: mounting the shoe assembly bottom-down; loosely supporting the sole on a support spacedly below the shoe assembly; shifting the sole on the support until the sole is in aligned relationship with the shoe assembly bottom; thereafter applying a holding force to the sole to hold it on the support; thereafter raising the support, while the holding force is maintained, to bring said surfaces into juxtaposed relationship; and thereafter pressing the sole against the shoe assembly bottom to thereby force said surfaces against each other and enable them to be attached to each other.

36. The method as defined in claim 35 further comprising: applying cement to the upper surface of the sole while said holding force is being applied and prior to the raising of the support.

37. The method as defined in claim 35 wherein the support is a hollow bladder having a cut-out in its upper surface underlying the sole and the holding force comprises a suction force extending through the cut-out.

38. The method as defined in claim 37 wherein the sole is pressed against the shoe assembly bottom by expanding the bladder to force the sole against the shoe assembly bottom.

39. The method as defined in claim 38 wherein the suction force is terminated concomitantly with the expansion of the bladder.

References Cited

UNITED STATES PATENTS

| | | | |
|---|---|---|---|
| 1,755,246 | 4/1930 | Ellis | 12—126 |
| 1,855,787 | 4/1932 | Ashton | 12—126 |
| 2,061,690 | 11/1936 | Winkley | 12—33.6 |
| 2,083,897 | 6/1937 | Drohan | 12—126 |
| 2,262,759 | 11/1941 | Finn | 12—33.6 |
| 2,241,515 | 5/1941 | Lancaster | 12—33.6 |
| 2,934,771 | 5/1960 | Willmott | 12—33.6 X |

PATRICK D. LAWSON, *Primary Examiner.*

U.S. Cl. X.R.

12—33.6, 127